(12) United States Patent
Parra Mantilla et al.

(10) Patent No.: US 11,492,533 B2
(45) Date of Patent: Nov. 8, 2022

(54) VISCOSITY MODIFYING, DEMULSIFIER AND FLOW IMPROVER COMPOSITION, ITS MANUFACTURING PROCESS, ITS USES AND METHOD FOR INCREASING PRODUCTION IN HEAVY AND EXTRA-HEAVY CRUDE OIL WELLS

(71) Applicant: FMT Serviços Indústria e Comércio Ltda, Rio de Janeiro (BR)

(72) Inventors: Pedro Parra Mantilla, Bucaramanga (CO); Marcio Rocha Mello, Rio de Janeiro (BR); Álvaro Piquet Carneiro Pessoa Dos Santos, Rio de Janeiro (BR); Marcos José Lourenco Ferreira, Rio de Janeiro (BR)

(73) Assignee: FMT Serviços Indústria e Comércio Ltda, Rio de Janeiro (BR)

( * ) Notice: Subject to any disclaimer, the term of this patent is extended or adjusted under 35 U.S.C. 154(b) by 0 days.

(21) Appl. No.: 17/051,673

(22) PCT Filed: May 17, 2018

(86) PCT No.: PCT/BR2018/050159
§ 371 (c)(1),
(2) Date: Oct. 29, 2020

(87) PCT Pub. No.: WO2019/218032
PCT Pub. Date: Nov. 21, 2019

(65) Prior Publication Data
US 2021/0189215 A1    Jun. 24, 2021

(51) Int. Cl.
*C09K 8/34* (2006.01)
*C09K 8/584* (2006.01)
*C09K 8/03* (2006.01)

(52) U.S. Cl.
CPC ............... *C09K 8/34* (2013.01); *C09K 8/584* (2013.01); *C09K 8/03* (2013.01); *C09K 2208/34* (2013.01)

(58) Field of Classification Search
CPC ...................................................... C09K 8/584
See application file for complete search history.

(56) References Cited

U.S. PATENT DOCUMENTS

2016/0032161 A1    2/2016  Campbell et al.

FOREIGN PATENT DOCUMENTS

| BR | PI 0405109-2 A | 7/2006 |
| WO | 95/17244 | 6/1995 |
| WO | 2005/075612 A1 | 8/2005 |
| WO | 2016/003677 A1 | 1/2016 |

OTHER PUBLICATIONS

International Search Report for PCT/BR2018/050159, dated Nov. 22, 2018.

*Primary Examiner* — William D Hutton, Jr.
*Assistant Examiner* — Avi T Skaist
(74) *Attorney, Agent, or Firm* — Sughrue Mion, PLLC

(57) ABSTRACT

The present invention relates to a viscosity modifying, demulsifier and flow improver composition for use in (crude) petroleum, its method of manufacture, and its uses, among them, to improve the flowability of heavy and extra-heavy crude oils, to increase the production of oil in the well and to improve the quality of the oil permanently produced from the addition of a formulated product containing conditioned organic surfactants for each type of crude oil.

20 Claims, 31 Drawing Sheets

VISCOSITY MODIFYING, DEMULSIFIER AND FLOW IMPROVER COMPOSITION, ITS MANUFACTURING PROCESS, ITS USES AND METHOD FOR INCREASING PRODUCTION IN HEAVY AND EXTRA-HEAVY CRUDE OIL WELLS

CROSS REFERENCE TO RELATED APPLICATIONS

This application is a National Stage of International Application No. PCT/BR2018/050159 filed May 17, 2018.

FIELD OF THE INVENTION

The present invention relates to a viscosity modifying, demulsifier and flow enhancer composition for use in (crude) oil, its method of manufacture, and its uses, among them, to improve the flowability of heavy and extra-heavy crude oils, to increase the production of oil in the well and to improve the quality of the permanently produced oil from the addition of a formulated product containing conditioned organic surfactants for each type of crude oil.

BACKGROUND OF THE INVENTION

The decline in conventional oil reserves in the world has led to the need for technological development capable of unconventionally exploiting the possibility of economically viable extraction of heavy and extra-heavy crude oil from the remaining reserves.

These types of oil are highly viscous and therefore have difficulty flowing in both the reservoir and transfer lines during production and through pipelines.

Alternatively, the superheated steam injection has been used in the production wells, for the purpose of increasing temperature and, consequently, reducing viscosity. This practice has high costs and environmental impacts to the oil production process.

On the other hand, there is also a wide range of additives and solvents on the market, individually developed, among other objectives, to reduce the viscosity of heavy and extra heavy crude oil, and to separate the water and solids present in such oils.

However, they are not favorable in aspects associated with the acquisition of durable properties for crude oil, and include strong and volatile solvents comprising BTX (Benzene, Toluene and/or Xylene) aromatic compounds, or other highly volatile compounds which cause health and environmental risks.

The present invention provides a viscosity reduction (in percentage drop) significantly higher than that observed in the existing additives and solvents, making it possible to raise the API grade of a crude oil in a manner not yet observed.

By means of the present invention the increase in the demulsibility of the crude oil was observed, rapidly separating the formation water, in addition, it was also observed the increase of the lubrication of the crude oil, improving the flow of production, and the acquired properties are permanent and add to the quality of crude oil produced.

Laboratory tests have been developed comparing, for example, the application of the present invention with naphtha, with the results reported herein being further evidence of the efficiency and synergistic effect of the present invention. No comparative tests were performed with the addition of diesel because commercial diesel contains high sulfur content, which is detrimental to the quality of crude oil.

In the past, various compositions and/or methods have been proposed to allow improvement of the fluidity and quality of the oils, which are described, for example, in the documents and products described below.

US 2010/0081588 describes a lubricating oil composition comprising (a) a major amount of a lubricating viscosity oil, and (b) an oil-soluble-tetra-functional hydrolyzable silane compound of the general formula Si—X4 or a hydrolysis product thereof, each X being independently a hydroxyl-containing group, hydro-carbyloxyl-containing group, acyloxyl containing group, amino-containing group, monoalkylamino-containing group or a dialkylamino containing group, and still being that the lubricating oil composition is free of any zinc dialkyl dithiophosphate. This patent addresses the formulation of oil for internal combustion engines where the described component has anti-wear function.

U.S. Pat. No. 9,550,937 B2 describes at least one biosurfactant which may be added to a hydrocarbon-based fluid to decrease the viscosity of the hydrocarbon-based fluid. The biosurfactant(s) may be less toxic to the environment than other diluents typically used to decrease the viscosity of such fluids. The biosurfactant(s) may be or include but is not limited to mycolic acids, glycolipids, lipopolysaccharides, lipoproteins-lipopeptides, phospholipids and combinations thereof. This description applies to the petroleum refining process and in the steps that seek to increase the production of light fractions by the refining of heavy residues and asphaltic resins.

WO200596711 discloses an emulsification technique which enables the formation of functional oil/water or functional granules/water systems, excellent in thermal stability and long-term stability and which can achieve the required HLB-independent emulsification of the functional oils, and the dispersion independent of the surface properties of the functional granules. An emulsifying dispersant comprising, as the main component, vesicles formed from an amphiphilic substance capable of self-assembly or an emulsifying dispersant comprising single particles of a biopolymer as the main component is used in the art. Particles made of amphiphilic substances capable of self-assembly are used. The amphiphilic substances are selected from polyoxyethylene hydrogenated castor oil derivatives represented by general formula (1) in which the average number of ethylene molecules added is 5 to 15, dialkyldimethyl-ammonium halides in which the chain length of the alkyl or alkylene is 8 to 22, and phospholipids or phospholipid derivatives. Further, a three-phase structure composed of an aqueous phase, an emulsifying dispersant phase and an oil phase formed on the surface of an emulsion to give an emulsion.

WO8501889 relates to methods and compositions for facilitating the transportation and combustion of highly viscous hydrocarbons by forming reduced viscosity hydrocarbon emulsions-in-water of and, in particular, bioemulsifier-stabilized hydrocarbon-in-water emulsions.

CA2980942 relates to microalgal compositions and methods for their use. The microalgal compositions include lubricants that are used in industrial and other applications.

The products marketed by Clariant may be cited (access on April 2018 through link: https://www.clariant.com/en/Business-Units/Oil-and-Mining-Services/Oil-Services/Heavy-Oil), which are separately and individually used in demulsification in the case of PHASETREAT®, or products for use in the flow level, which are intended to avoid agglomeration and reduce solid formations for higher flow volumes, thereby reducing the viscosity of heavy oils, such as also removing solid deposits, sand and clays from the production pipe to increase flow levels.

The nanoActiv® HRT product, produced by Nissan Chemical (access on April 2018 through link: https://www.nanoactiv.com/) acts physically, allowing the colloidal particles to clash with oil "bubbles" adsorbed on sand or limestone, reducing the size and causing a greater flow. Thus, this process can only be done in fracture oil extraction processes, in which the water with various chemicals is injected at very high pressure in the reservoir.

However, the above-referenced documents and products do not solve the problem, notably in the extraction and production stages of the crude oil, nor do they promote demulsibility, water-oil separation and viscosity reduction as efficiently, concomitantly and permanently as observed through of the use of the composition of the present invention.

Surprisingly, by the effect of molecular lubrication, the composition disclosed herein assists in the release of the light hydrocarbons present in the resin micelles, reducing the dynamic viscosity of the crude oil and improving the pumpability as a low water content product, that is, the present composition strengthens the breakdown of emulsions and provides for the flow of crude oil formation water in onshore and offshore production activities.

In addition, the present invention is directed, among other aspects, to the solution of the high viscosity of heavy and extra-heavy oils in the oil industry in the field of the extraction/production chain, improved recovery, storage and transportation of the oil, i.e., from to the refinery ("downstream").

In addition, the present invention provides favorable aspects associated with health and environmental risks, as well as the acquisition of durable properties. for crude oil, due to the high flash point and the reduced toxicity.

SUMMARY OF THE INVENTION

The present invention relates to a composition comprising a balanced formula which enables the process referred to as "molecular level lubrication", i.e. when the lighter hydrocarbons, which are entrapped within the micelles of resins and asphaltenes, are released, along time—this is confirmed by the appearance of lighter hydrocarbon peaks in gas chromatography tests, as demonstrated in the examples described in the present patent application below.

The physical consequence is a great reduction of the dynamic viscosity and, consequently, the increase of the API grade of the oil. The presence of lighter hydrocarbons decreases the polarity of the crude oil and increases the demulsibility (water separation).

The demulsifying components of the alkaline composition of the present patent application, such as fatty acid esters, reduce the acidity of some types of crude oil. In extreme cases, sulfur reduction is observed by the formation of soluble sulphates which are removed together with the separation of the formation water, while removing salts, as in the case of sodium chloride, which is eventually present in crude oil.

The presence of lubricating agents, which act at a molecular level, increases fluidity, both in the elevation of the well and in the transportation and pumping, reducing the friction with the walls of the pipelines.

As crude oil is a blend of various components and has characteristics that vary from field to field, the demulsifying composition of the present invention has been tested for specific uses as detailed herein to extract the properties and capabilities thereof.

Several comparative tests were made with naphtha, which is commonly used in countries where heavy oils are found. Preliminary tests were also performed with diesel as a diluent. The results are poor and absurd from a technical point of view. Naphtha acts only as a diluent, with a high degree of dangerousness and losses by evaporation; diesel, in addition to containing sulfur, further deteriorating the crude oil and acting as a corrosive, also presents light fractions that evaporate, leaving only the heavy compounds, sulfur and metals.

Tests under sub-freezing conditions, that is, average temperatures below the freezing point of water, have surprisingly been shown to be consistent with excellent results of the present invention with crude oil, with application of only a range of about 3 to about 5% by volume of the present composition disclosed in the present application, in relation to the volume of crude oil.

Recent relative permeability evaluations have demonstrated a positive variation of the permeability to the oil with the presence of the composition of the invention. This confirms the positive effect of the recovery of the well and, consequently, the increase of its production.

The present invention adds not only permanent physical-chemical properties, but also value to the crude oil produced.

OBJECTS OF THE INVENTION

It is an object of the present invention to provide a composition for improving the fluidity and quality of heavy and extra-heavy crude oils.

It is also an object of the present invention to obtain a larger oil production in the well.

It is further an object of the present invention to optimize the treatment and transportation costs of such crude oils in both onshore and offshore activities.

It is a further object of the present invention to further commercial valorization of heavy and extra-heavy crude oil through the use of the present invention.

It is yet another object of the present invention to reduce the sulfur content in heavy and extra heavy crude oils through the use of the present invention.

DESCRIPTION OF THE EMBODIMENTS OF THE INVENTION

The present invention provides a viscosity modifying, demulsifier and flow improving composition for use in (crude) oil, its manufacturing process, and its uses for application in heavy and/or extra-heavy crude oils, said composition comprising:
  a high molecular weight mineral solvent,
  a surfactant product, and
  a vegetable based lubricant,
  wherein the composition of the present invention is substantially organic (100% organic), non-corrosive, has low volatility, is petroleum compatible, contains no water, does not contain aromatic solvents (such as benzene, toluene and/or xylene), does not contain a solid phase, nor does it contain inorganic components that negatively alter said composition, the handling, storage and/or refining of crude oil.

The objects of the invention are achieved by means of a demulsifying and viscosity modifying composition comprising a homogeneous mixture of the following components:

(a) from about 50% to about 60% by volume of low volatility $C_8$ to $C_{16}$ oil distillate;

(b) from about 45% to about 35% by volume of a liquid lipid mixture which is comprised of unsaturated lipids (about 80% by volume relative to the total volume of said lipid mixture) and saturated lipids (about 20% by volume relative to the total volume of said lipid mixture); and (c) from about 1% to about 5% by volume of phospholipid, such as, for example, fatty acid ester, relative to the total volume of said composition.

The $C_8$ to $C_{16}$ petroleum distillate corresponds to the matrix of the product and its main function is to be a diluent and to reduce the viscosity of the heavy and extra-heavy crudes to which said composition is applied.

The liquid lipid mixture is chemically coupled to said petroleum distillate and allows to generate demulsifying properties with which to improve the lubricity of said composition and crude oil to which said composition is applied.

In addition, said liquid lipid mixture is represented by the formula:

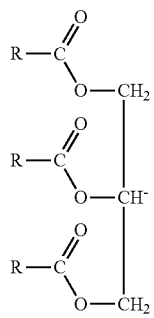

wherein

R is a hydrocarbon with single and/or double bonds, wherein R has 12 to 20 carbon atoms.

The phospholipid is chemically coupled to the other two components, converting the mixture into an amphoteric surfactant, which helps to eliminate the water present in heavy and extra-heavy oils.

Further, said phospholipids are represented by the formula:

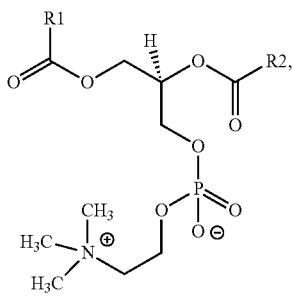

wherein

R1 is a hydrocarbon having single and/or double bonds, wherein R1 has from 14 to 20 carbon atoms; and R2 is a hydrocarbon with single and/or double bonds, R2 having 11 to 17 carbon atoms.

In addition, the rate of application of the composition disclosed in the present application in volume may vary, depending on the type and gross or specific conditions of production and transport, from about 3% to about 5% of the total volume, such value being defined by preliminary laboratory tests.

The variation in the volumes of the mixture is made based on the type of heavy and/or extra-heavy crude oil to which the present invention will be applied.

For each type of heavy and/or extra-heavy crude oil, an optimum dose of composition and respective volume ratios were determined to the mixture of its basic components.

The lower the API grade, the higher the solvent content and less the lubricant. This differentiates the different ranges used in the invention. The greater the acidity or the content of resins and asphaltenes, the greater the amount of phospholipid or fatty acid ester, relative to the solvent and the vegetable lubricant.

The relationship between the heavy and extra-heavy oil, their respective characteristics and classifications is correlated with some of the preferred compositions of the composition disclosed by the present invention, and referred to in the present application as: FMT-200, FMT-220, FMT-220, FMT-300, FMT-310, FMT-320 and FMT-330, such relationship being represented in Table 1:

TABLE 1

Correlation between type of crude oil and the present invention

| Type of crude oil | | Embodiments of the present invention | | | | |
|---|---|---|---|---|---|---|
| Heavy crude oil | Paraffin | FMT-200 | | | | |
| | Aromatic | | FMT-210 | | | |
| | Asphaltenic | | | FMT-220 | | |
| Extra Heavy Crude Oil | Paraffin | | | | FMT-300 | |
| | Aromatic | | | | | FMT-310 |
| | Asphaltenic | | | | | FMT-320 |

Preferred ranges of each of the components of the invention are specified for each type of oil in said preferred embodiments of the invention.

Accordingly, about 3% of the composition of the present invention, depending on the type of oil (paraffinic, aromatic or asphaltenic), are added to the heavy crude oils (from about 10° to 20° API) and about 5% of the composition of the present invention are added to the extra-heavy crude oils (<10° API) depending on the type of crude oil (paraffinic, aromatic or asphaltenic).

The relationship between each type of crude oil, their respective characteristics and classifications is correlated with the preferred volumetric ratios for each component of the preferred embodiments of the composition disclosed by the present invention, referred to as: FMT-200, FMT-210, FMT-220, FMT-300, FMT-310, FMT-320 and FMT-330, and also correlated with the total volume of composition of the present invention added for each type of crude oil (paraffinic, aromatic or asphaltenic), such ratio being represented in Table 2:

TABLE 2

Correlation between the types of crude oil and the volumetric ratios of each component of the preferred embodiments of the invention and the total volume of the present invention

| Type of crude oil | | Volume of the present invention (% v/v) | Preferred embodiments | Components of preferred embodiments (% v/v) | | |
|---|---|---|---|---|---|---|
| | | | | Petroleum Distillate | Lipid mixture | Phospholipids |
| Heavy crude oil | Paraffin | 3 | FMT-200 | 52 | 46 | 2 |
| | Aromatic | | FMT-210 | 50 | 49 | 1 |
| | Asphaltenic | | FMT-220 | 54 | 43 | 3 |
| Extra Heavy Crude Oil | Paraffin | 5 | FMT-300 | 58 | 37 | 5 |
| | Aromatic | | FMT-310 | 56 | 40 | 4 |
| | Asphaltenic | | FMT-320 | 60 | 35 | 5 |

According to Table 2, the composition of the present invention is applied in the range of about 3 to about 5% of the total volume, depending on the classification of the heavy and/or extra-heavy crude oil to which said composition is applied.

In addition, the composition of the present invention comprises:

(a) from about 50% to 54% by volume of petroleum distillate;

(b) from about 43% to 49% by volume of a lipid mixture; and (c) from about 1% to 3% by volume of phospholipid, relative to the total volume of said composition, when said composition is for use in heavy crude oil.

The present composition comprises:

(a) about 52% by volume of petroleum distillate;

(b) about 46% by volume of a lipid mixture; and (c) about 2% by volume of phospholipid, relative to the total volume of said composition, when said composition is for use in paraffinic heavy crude oil.

The present composition comprises:

(a) about 50% by volume of petroleum distillate;

(b) about 49% by volume of a lipid mixture; and (c) about 1% by volume of phospholipid, relative to the total volume of said composition, when said composition is for use in aromatic heavy crude oil.

The present composition comprises (a) about 54% by volume of petroleum distillate;

(b) about 43% by volume of a lipid mixture; and (c) about 3% by volume of phospholipid, relative to the total volume of said composition, when said composition is for use in asphaltenic heavy crude oil.

In addition, the composition of the present invention further comprises:

(a) from about 56% to 60% by volume of petroleum distillate;

(b) from about 35% to 40% by volume of a lipid mixture; and (c) from about 4% to 5% by volume of phospholipid, relative to the total volume of said composition, when said composition is for use in extra-heavy crude oil.

The present composition comprises:

(a) about 58% by volume of petroleum distillate;

(b) about 37% by volume of a lipid mixture; and (c) about 5% by volume of phospholipid, relative to the total volume of said composition, when said composition is for use in paraffinic extra-heavy crude oil.

The present composition comprises:

(a) about 56% by volume of petroleum distillate;

(b) about 40% by volume of a lipid mixture; and (c) about 4% by volume of phospholipid, relative to the total volume of said composition, when said composition is for use in extra-heavy aromatic crude oil.

The composition of the present invention comprises (a) about 60% by volume of petroleum distillate;

(b) about 35% by volume of a lipid mixture; and (c) about 5% by volume of phospholipid, relative to the total volume of said composition, when said composition is for use in extra-heavy asphaltenic crude oil.

By applying the invention to heavy and/or extra-heavy crude oils, it has surprisingly been found that the viscosity decreases from about 50% to about 85% from the original crude viscosity value at ambient temperature (0 C to 50° C.), wherein the largest decreases were observed at lower temperatures.

It is further an embodiment of the present invention to reduce the sulfur content, significantly, in some types of petroleum.

The sulfur present in the oil may be, for example, in the form of gas—hydrogen sulphide and mercaptans—or in the form emulsified through thio-compounds.

The alkaline components present in the present invention may react, neutralizing or forming salts which are eliminated together with the formation water, due to the demulsifying power of the invention.

Reduction of the sulfur content by the application of the present invention is not an embodiment extensive to all types of crude oil, since it will depend on the manner in which the sulfur is present in the crude oil.

Furthermore, the process for preparing said composition can be carried out in tanks or containers having circulating pumps coupled, and allowing the recirculation and homogenization of the components, the homogenization time being about 6 hours.

According to the laboratory analysis, mixing may be performed at ambient temperatures (between 0° C. and 50° C.).

As to the field of use of the present invention, in addition to those mentioned, one of the preferred uses of the present invention is in the oil field or reservoir, in which the present invention is injected by pumping of a stock reservoir, calculated according to the volume of rock (or reservoir pore space), which it is desirable to invade. Preferably, it is recommended to wait at least 24 hours for the present invention to interact with the oil in the reservoir.

It is a further use of the present invention, the use in oil wells, with the present invention being applied (about 3% to about 5% by volume, as appropriate) through capillary tubes installed along the production line, enabling the product to reach the bottom of the well and mix with crude oil, improving its fluidity during transportation to the surface.

It is a further use of the present invention a use directly for oils in tanks, and to add the present invention to the surface oil, it is necessary to move the oil from one tank to another to add the corresponding volume of product and thus ensure that it is mixed with the required volume of crude oil. Preferably, it is recommended to wait for at least 24 hours for the present invention to interact with the oil in the tank.

It is also a use of the present invention the use in pipelines, wherein present invention is applied by means of a dosing pump, the volume of the present invention being added (about 3% to about 5%, as appropriate), as the oil flows through the pipeline.

DESCRIPTION OF THE DRAWINGS

The present invention will hereinafter be more fully described. The drawings show:

FIG. 5 shows viscosity curves for the Chichimene, Remanso, Gaitero and Capella crude oils, produced in Colombia, and Athabasca, produced in Canada;

EXAMPLES

The characterization of various preferred embodiments of the present invention is described in the following examples, showing the synergistic effects developed by the present invention and the methods of preparation thereof.

The features of the embodiments numbered in the present invention may be combined with the features of other embodiments disclosed herein, including both the foregoing embodiments, compositions, methods of manufacture and uses thereof.

Figure 1:
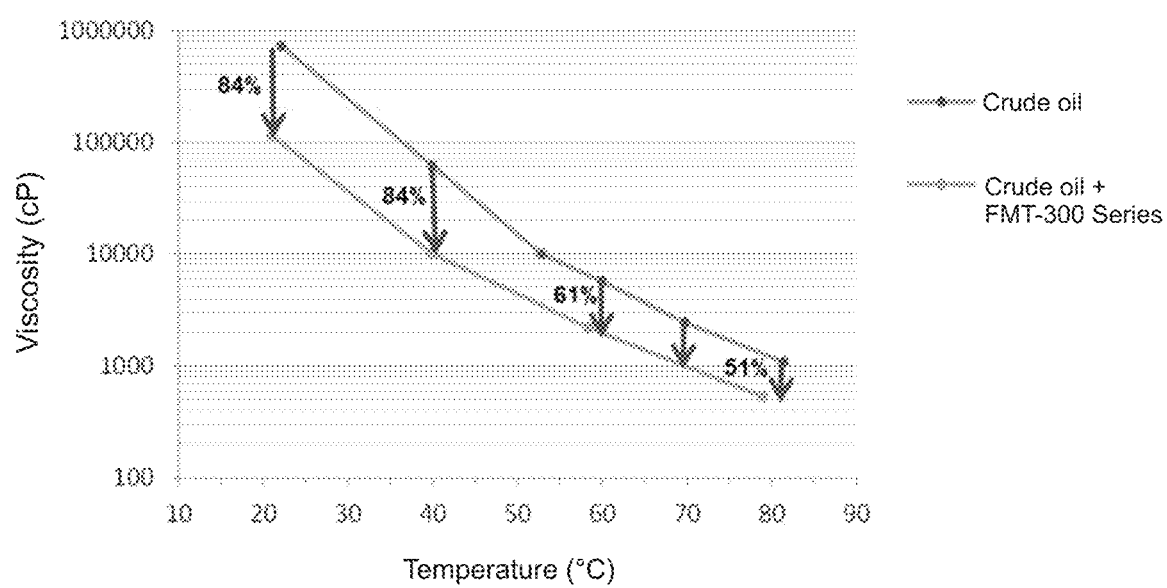
FIG. 1—is a graph in a preferred embodiment of the invention, whereby viscosity reduction is identified in a crude oil sample rated at 8.9° API.

FIG. 1 shows the viscosity reduction in a crude oil sample rated at 8.9° API, that is, the effect of using the FMT-300 Series. The graph shows that the efficiency of the invention is more relevant at low temperatures, when crude oil has higher viscosities, measured in centipoise. This effect is evidenced by the data of FIG. 1 and represented in Table 3:

TABLE 3

| Test performed of the FMT-300 Series | | | |
|---|---|---|---|
| Original (Crude) Oil | | (Crude) Oil + FMT-300 Series | |
| Temperature (° F.) | Viscosity (Cp) | Viscosity with the use of the FMT-300 Series | Decrease in Viscosity (%) |
| 72 (22° C.) | 722302 | 115321 | 84.0 |
| 104 (40° C.) | 61220 | 5838 | 90.5 |
| 127 (53° C.) | 9961 | | |
| 140 (60° C.) | 5679 | 2197 | 61.3 |
| 158 (70° C.) | 2454 | 1022 | 58.3 |
| 179 (81° C.) | 1085 | 531 | 51.1 |

Figure 2:
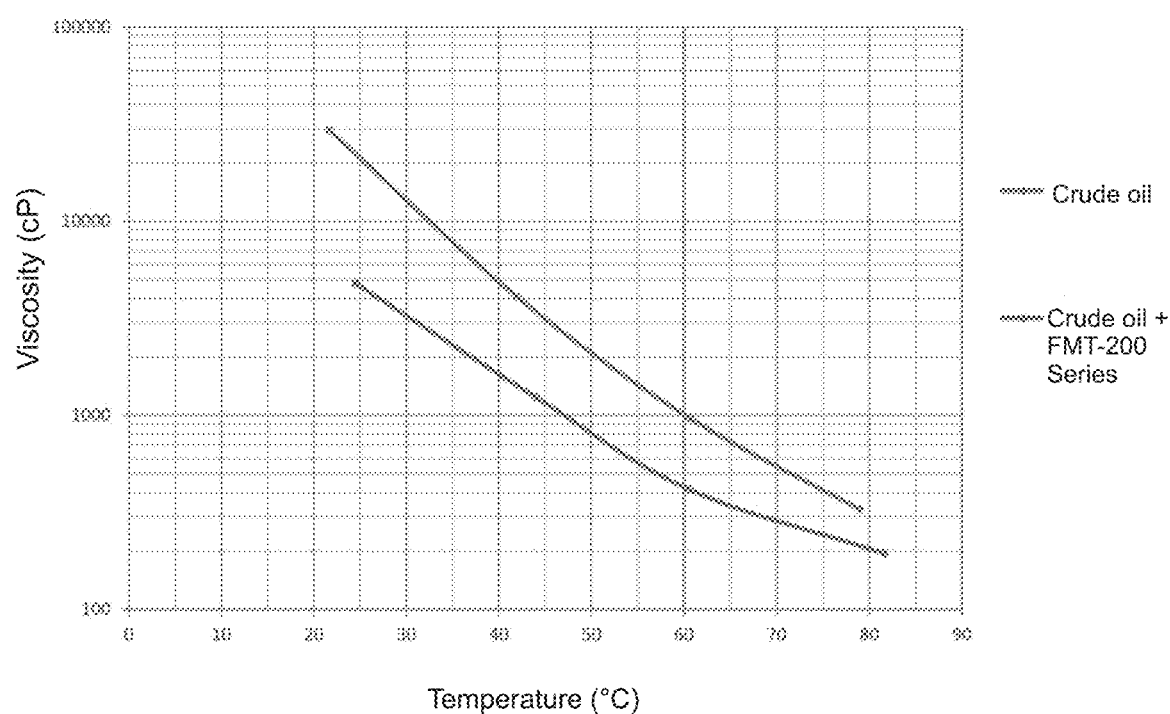
FIG. 2—is a graph in a preferred embodiment of the invention, whereby viscosity reduction is identified in a crude oil sample rated at 12.1° API.

FIG. 2 shows the viscosity reduction in a crude oil sample rated at 12.1° API as the temperature is raised. Preferably, FIG. 2 is to be evaluated in comparison with FIG. 1, indicating that the more viscous (lower API grade), the greater the efficiency of the invention in reducing the viscosity. Thus, the effect of the use of the FMT-200 Series is confirmed by the data of FIG. 2, which is represented in Table 4:

TABLE 4

Test performed of the FMT-200 Series

| Original (Crude) Oil | | (Crude) Oil + FMT-200 Series | |
|---|---|---|---|
| Temperature (° F.) | Viscosity (Cp) | Viscosity with the use of the FMT-200 Series | Decrease in Viscosity (%) |
| 72 (22° C.) | 29338.0 | 4759.0 | 83.8 |
| 104 (40° C.) | 4078.7 | 1234.6 | 69.7 |
| 140 (60° C.) | 968.9 | 414.2 | 57.3 |
| 176 (80° C.) | 326.9 | 194.1 | 40.6 |

Figure 3:
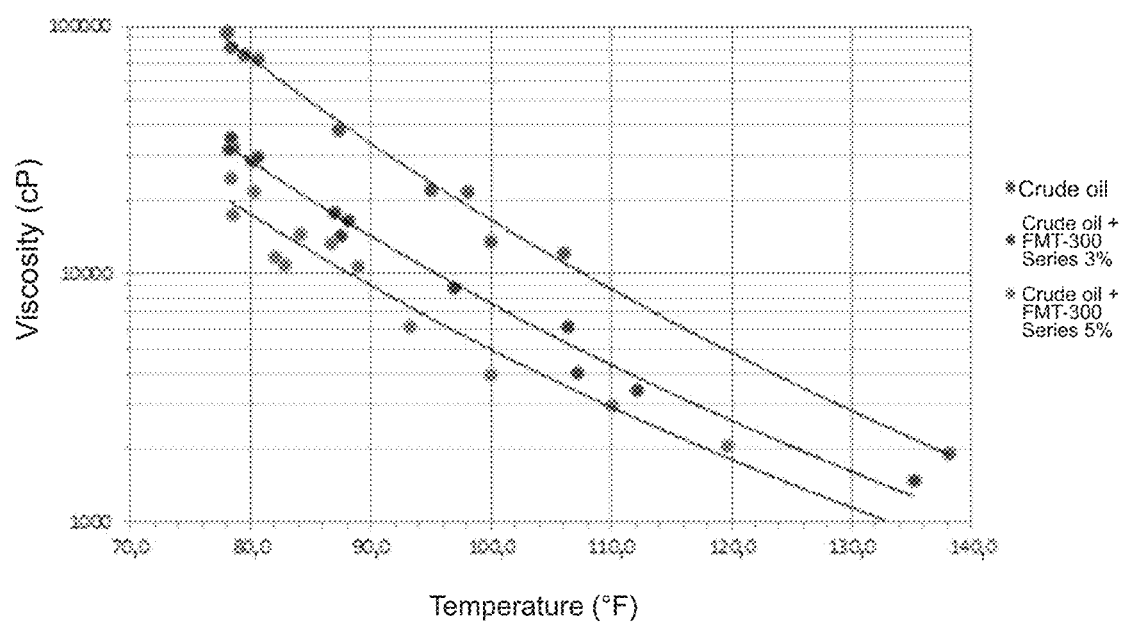
FIG. 3—is a graph, in a preferred embodiment of the invention, whereby the viscosity reduction is identified in a crude oil sample rated at 11.4° API as the temperature is raised.

FIG. 3 shows the viscosity reduction in a crude oil sample rated at 14.4° API, that is, the effect of using the FMT-200 Series. Its effect is evidenced by the data of FIG. 3, which indicates the higher efficiency of the invention in viscosity reduction when a higher concentration of the invention (5%) is used in relation to the lower concentration (3%). The ideal dosage is defined by the viscosity characteristics of crude oil and the best economic balance in the oil production process, said data being represented in Table 5:

TABLE 5

Test performed of the FMT-200 Series

| Original (Crude) Oil | | (Crude) Oil + FMT-200 Series | |
|---|---|---|---|
| Temperature (° F.) | Viscosity (Cp) | Viscosity with the use of the FMT-200 Series | Decrease in Viscosity (%) |
| 77 (25° C.) | 96438 | 1569 | 98.4 |
| 86 (30° C.) | 45831 | 978 | 97.9 |
| 95 (35° C.) | 23456 | 640 | 97.3 |
| 104 (40° C.) | 12756 | 434 | 96.6 |
| 122 (50° C.) | 4356 | 220 | 94.9 |

Figure 4:
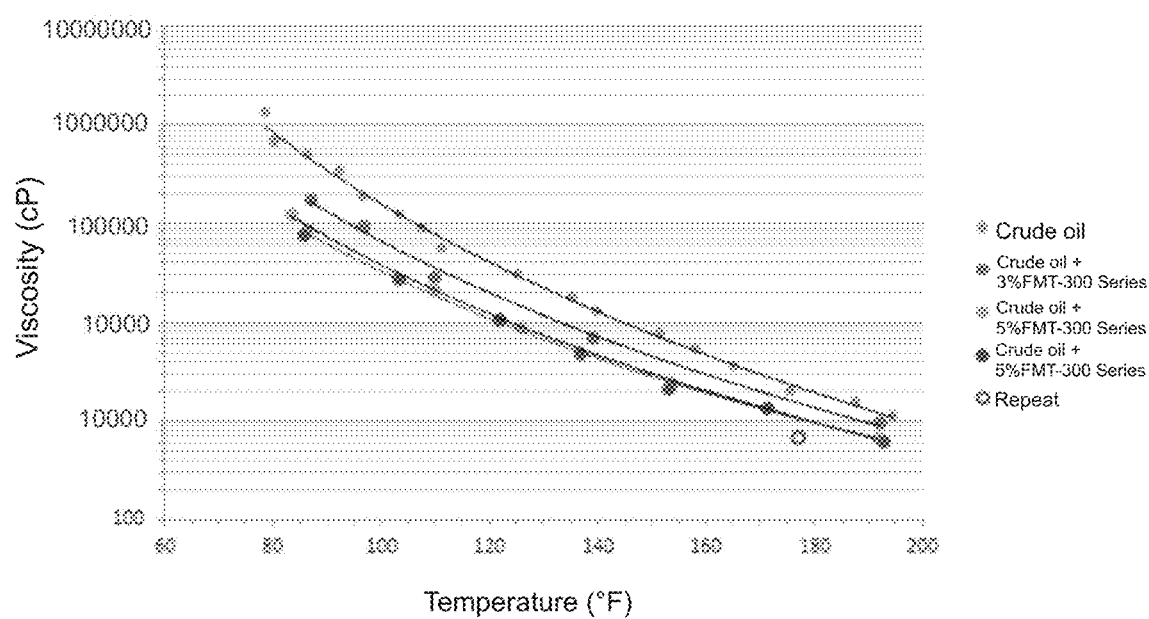
FIG. 4—is a graph, in a preferred embodiment of the invention, whereby the viscosity reduction is identified in a crude oil sample rated at 8.1° API as the temperature is raised.
Figure 5:
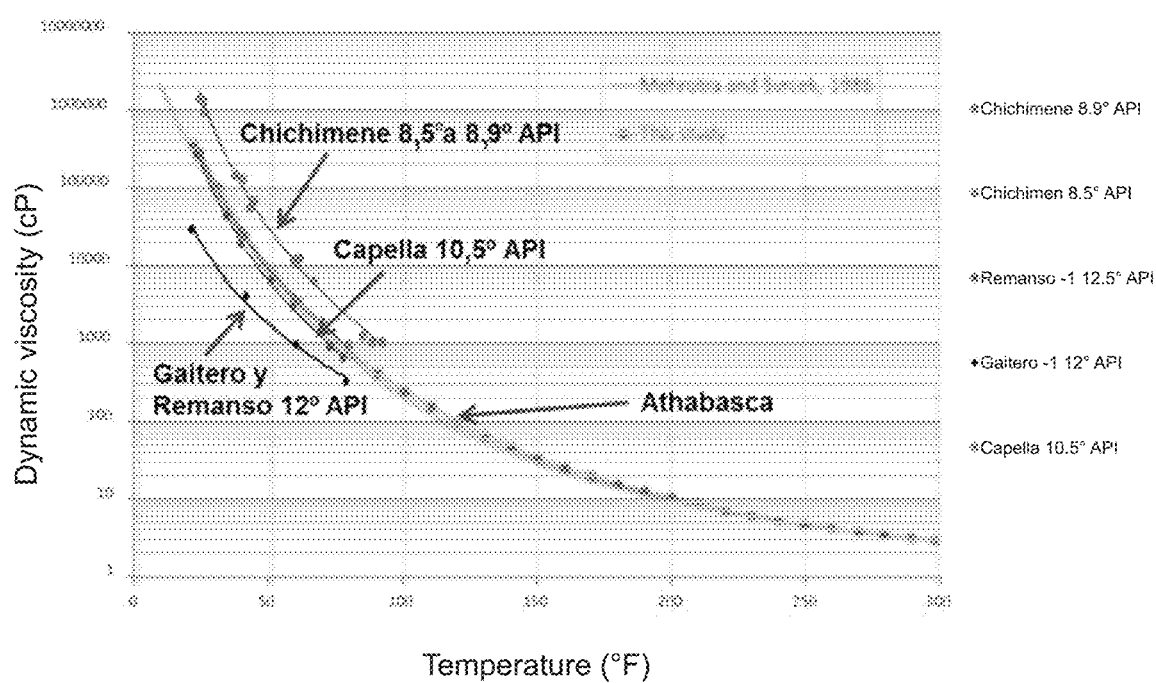
FIG. 5—is a graph in a preferred embodiment of the invention, whereby various types of crude oils are used for the research and development of the invention.

FIG. 4 shows the viscosity reduction in a sample of crude oil rated at 8.1° API, that is, the effect of the use of the FMT-300 Series. FIG. 4 is to be evaluated in comparison with FIG. 3, indicating that the more viscous (lower grade API) the greater the efficiency of the invention in reducing the viscosity, either at the concentration of 3% or 5%. Its effect is evidenced by the data of FIG. 4, and represented in Table 6:

FIG. 5 identifies several types of crude oils used in the research and development of the invention (Chichimene, Remanso, Piper and Capella, produced in Colombia, and Athabasca produced in Canada), which is a further proof of the effect of the present invention.

Figure 6:
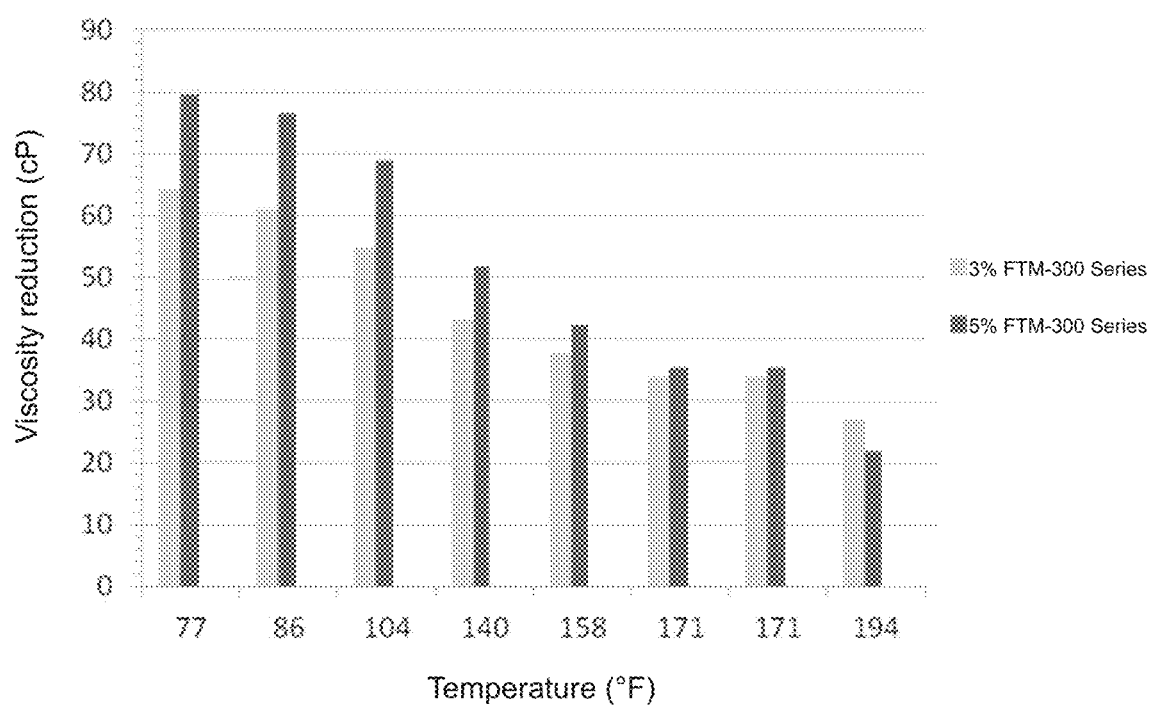
FIG. 6—is a graph, in a preferred embodiment of the invention, whereby the viscosity reduction efficiency is identified by a bar graph using about 3% or about 5% of the FMT-300 Series of the invention in the Chichimene crude oil.

Through FIG. 6 the viscosity reduction efficiency is identified by the bar graph using about 3% or about 5% of the FMT-300 Series in the Chichimene crude oil. It is important to note that at higher temperatures, when viscosity is lower, there is no relevant difference in viscosity reduction by using about 3% or about 5% of the invention on crude oil. Its effect is evidenced by the data of FIG. 6, and represented in Table 7:

TABLE 7

Test performed on Chichimene crude oil

| | Decrease in Viscosity (%) | |
|---|---|---|
| Temperature (° F.) | Use of 3% of the FMT-300 Series | Use of 5% of the FMT-300 Series |
| 77.0 (25° C.) | 64.3 | 80.1 |
| 86.0 (30° C.) | 61.1 | 76.5 |
| 104.0 (40° C.) | 54.9 | 68.9 |
| 140.0 (60° C.) | 43.3 | 51.8 |
| 158.0 (70° C.) | 37.7 | 42.3 |
| 170.6 (77° C.) | 33.9 | 35.4 |
| 194.0 (90° C.) | 27.0 | 21.9 |

Figure 7:
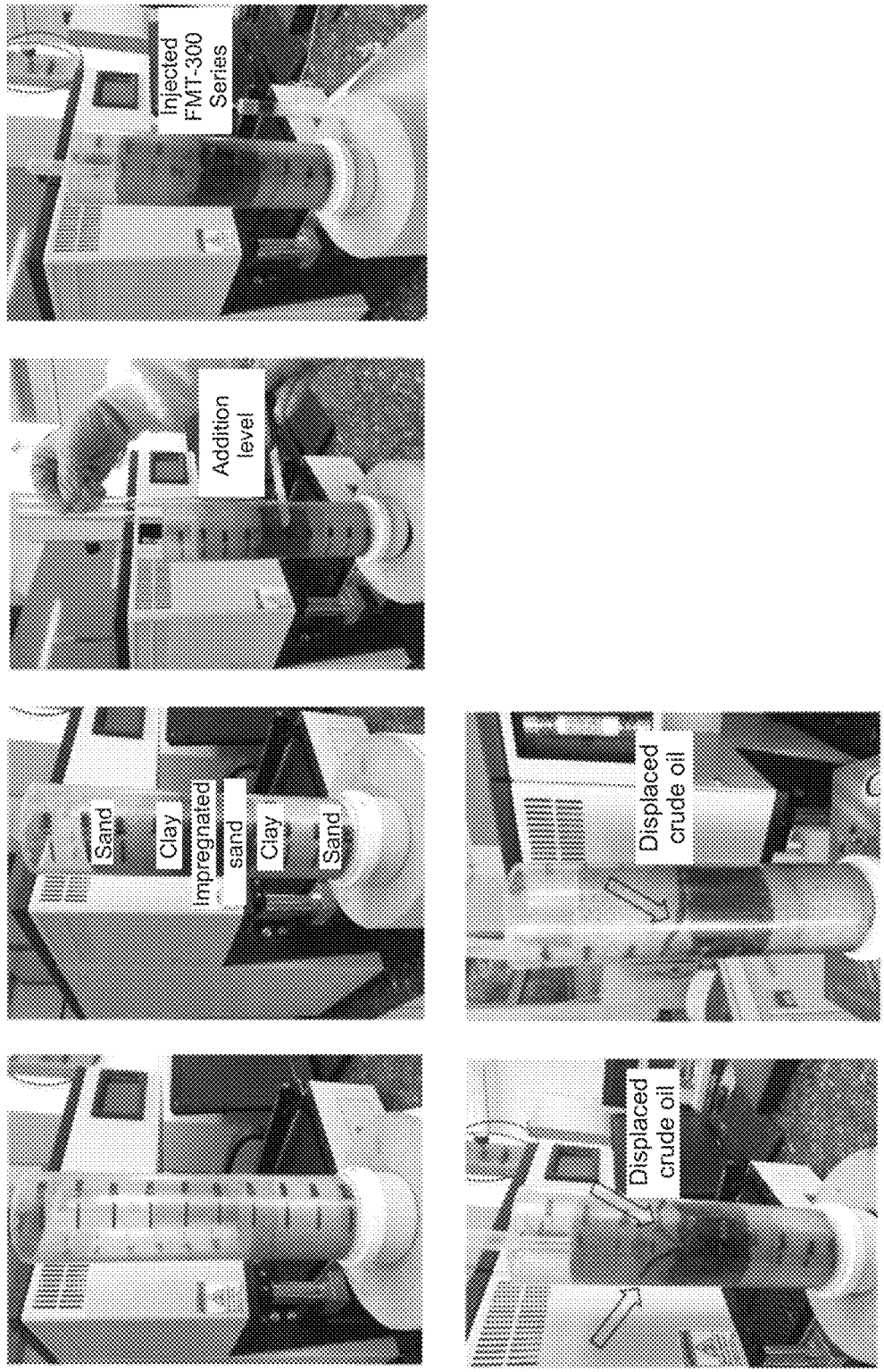
FIG. 7—is a picture, in a preferred embodiment of the invention, whereby the effect of increasing the lubricating capacity of the invention relative to crude oil is demonstrated.

FIG. 7 shows the effect of increasing the lubricating capacity of the invention relative to crude oil. The situation demonstrates a formation of an oil reservoir in a sandy bed. It is verified that the addition of the FMT-300 Series of the invention at a concentration of 5% promotes the displacement of crude oil, allowing greater recovery from the same reservoir and consequent increase of the productivity of the well. Thus, FIG. 7 is a further demonstration of the effect of the present invention.

Figure 8:
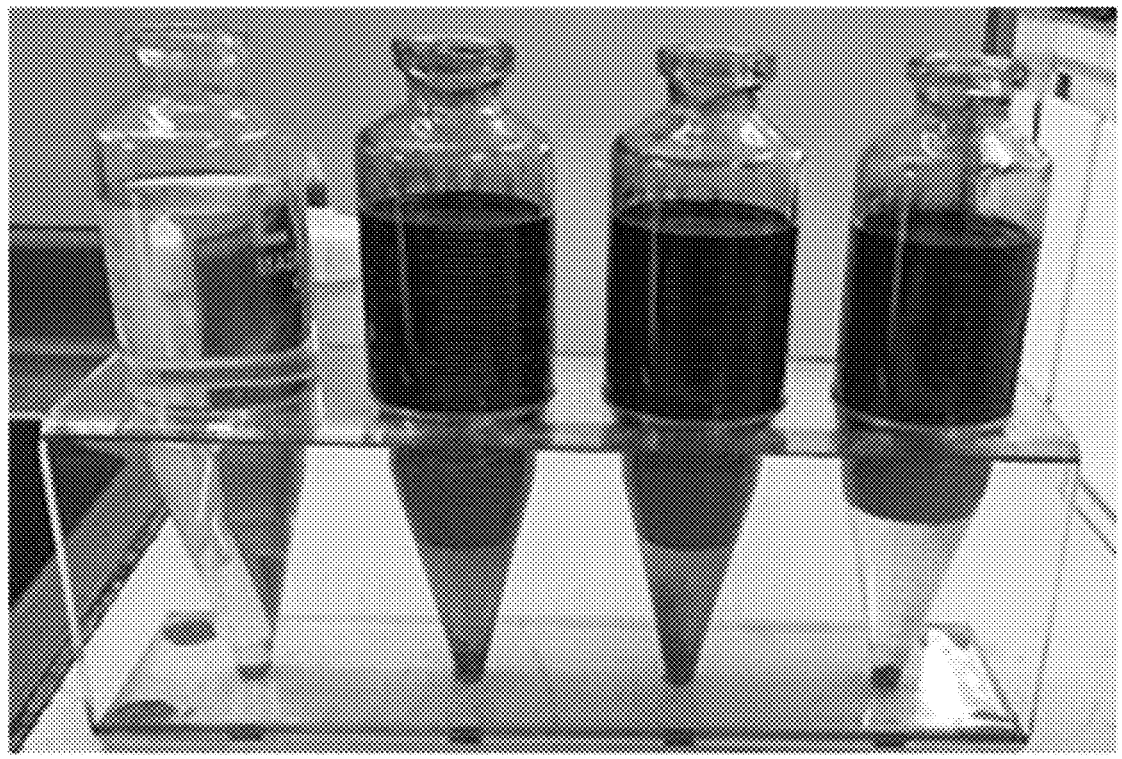
FIG. 8—is picture, in a preferred embodiment of the invention, whereby the sample of the right-hand centrifuge tube received 3% of the invention, while the other tubes are used as references and did not receive the invention.

FIG. 8 shows the effect of increasing demulsibility—separation of formation water, when the invention is added to the oil with water content, breaking the emulsion and separating water. Thus, FIG. 8 is a further demonstration of the effect of the present invention.

Figure 9:
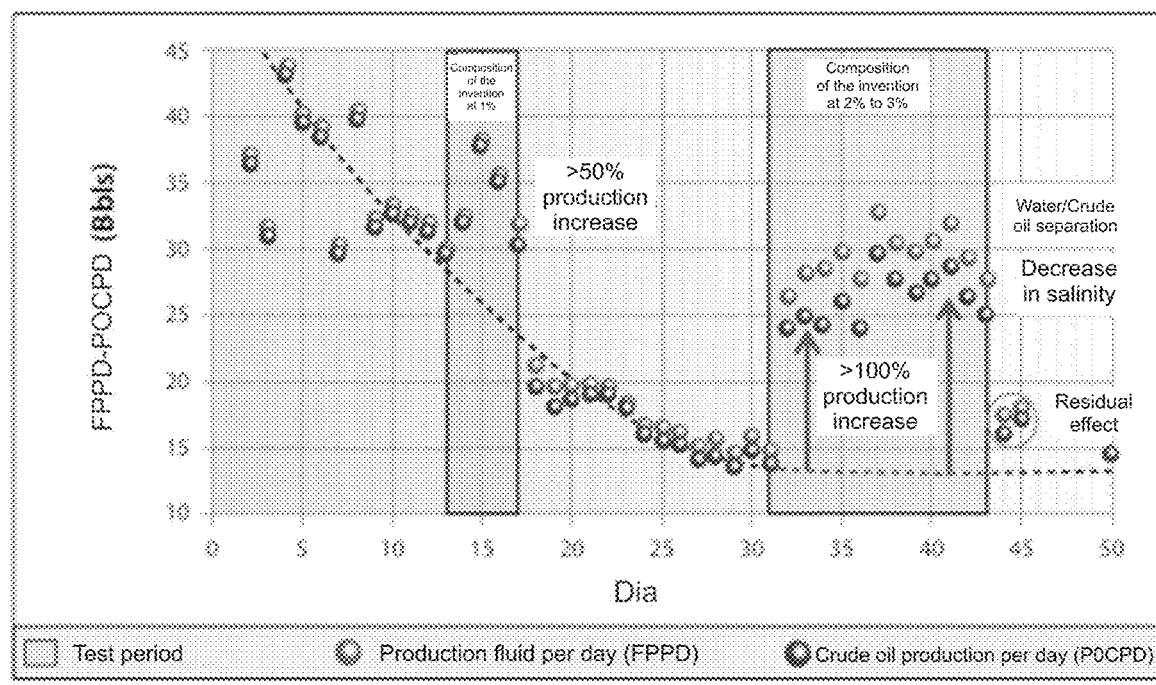
FIG. 9—is a graph, in a preferred embodiment of the invention, whereby a more than 50% increase in the productivity of a given oil well is identified when the invention is used in concentrations up to 3%, with reduction of water and decrease in the salinity of crude oil.

FIG. 9 shows the increase of more than 50% in the productivity of a given oil well, in addition to the increase in the reduction of water and decrease in the salinity of crude

TABLE 6

Test performed of the FMT-300 Series

| Original (Crude) Oil | | (Crude) Oil + FMT-300 Series (3% v/v) | | (Crude) Oil + FMT-300 Series (5% v/v) | | (Crude) Oil + FMT-300 Series (5% v/v) | |
|---|---|---|---|---|---|---|---|
| Temperature (° F.) | Viscosity (Cp) | Viscosity with the use of FMT-300 Series (cP) | Decrease in Viscosity (%) | Viscosity with the use of FMT-300 Series (cP) | Decrease in Viscosity (%) | Viscosity with the use of FMT-300 Series (cP) | Decrease in Viscosity (%) |
| 77 (25° C.) | 1129699 | 372289 | 670 | 195293 | 82.7 | 159229 | 85.9 |
| 86 (30° C.) | 493322 | 179335 | 63.6 | 97927 | 80.1 | 81706 | 83.4 |
| 104 (40° C.) | 118715 | 51087 | 57.0 | 29889 | 74.8 | 25947 | 78.1 |
| 140 (60° C.) | 12791 | 7166 | 44.0 | 4671 | 63.5 | 4314 | 66.3 |
| 176 (80° C.) | 2301 | 1580 | 31.4 | 1119 | 51.4 | 1084 | 52.9 |
| 194 (90° C.) | 1109 | 830 | 25.2 | 609 | 45.1 | 602 | 45.7 | oil. Accordingly, FIG. 9 is a further demonstration of the effect of the present invention.

Figure 10:
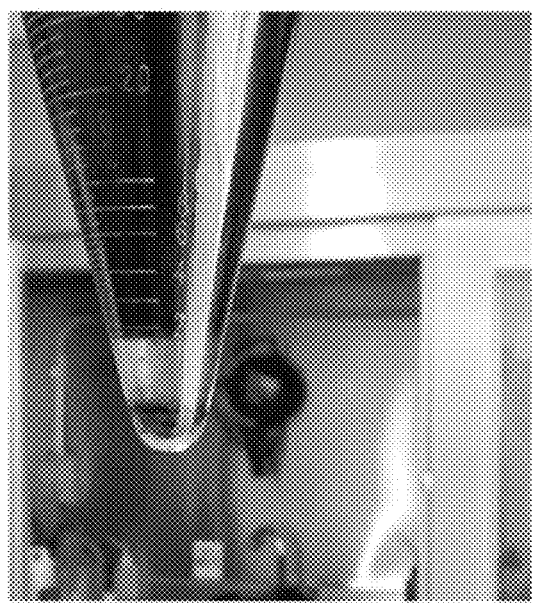
FIG. 10—is a picture, in a preferred embodiment of the invention, whereby a sample is identified without addition of the composition disclosed by the present invention and the same sample is shown 24 hours after addition of the composition disclosed by the present invention.
Figure 10:
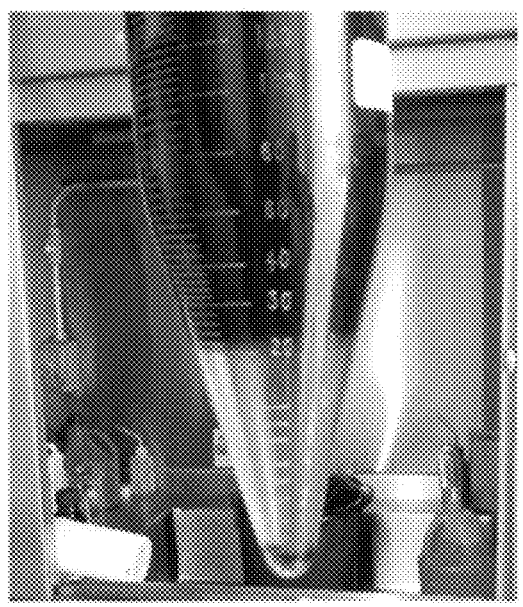

FIG. 10 shows the effect of water-oil emulsion breaking, leading to greater efficiency and productivity of active wells. Thus, FIG. 10 is a further demonstration of the effect of the present invention.

Figure 11:
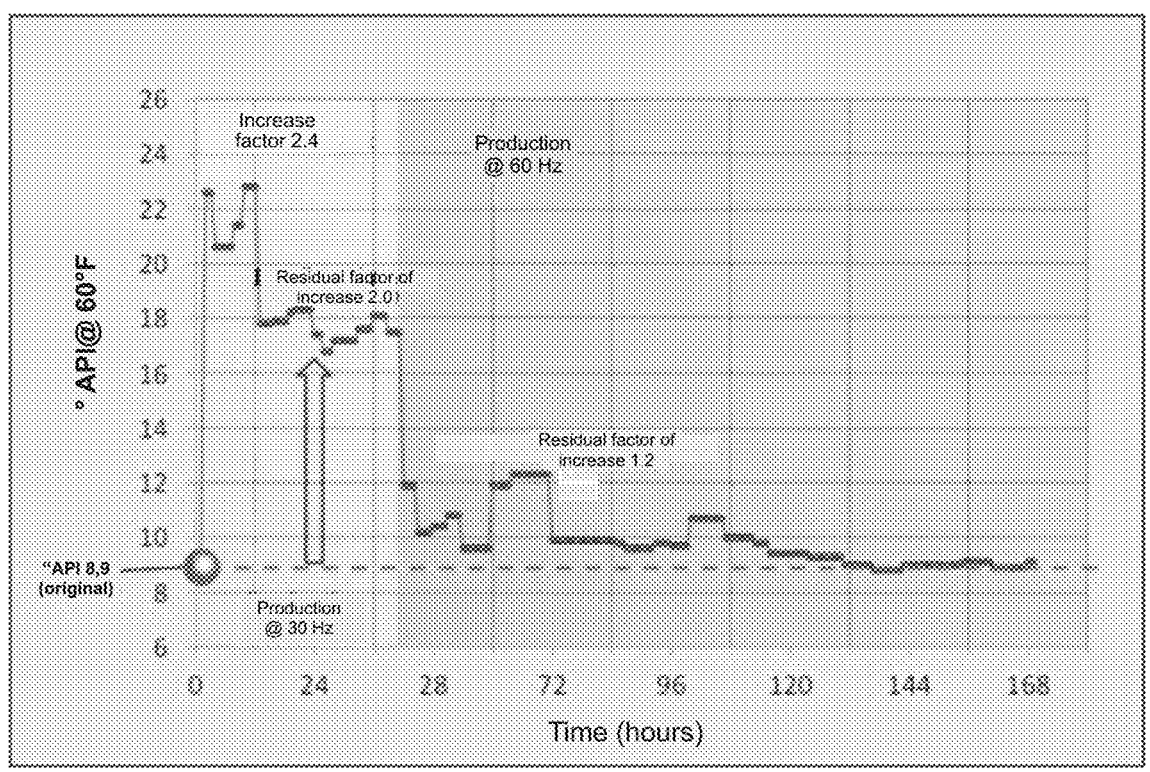
FIG. 11—is a graph, in a preferred embodiment of the invention, whereby a practical test is identified in an 8.9° API oil well by using 5% of the FMT-300 Series of the invention, making it possible to produce a crude oil up to 22° API, with an improvement in the quality of the product and, also, commercial gains for the oil produced. It is also noted in FIG. 11 is a reduction of the frequency of 60 Hz to 30 Hz of the pump used in this process, proportionally reducing the electric energy costs involved.

FIG. 11 shows the effect of the present invention on an 8.9° API oil well by using 5% of the FMT-300 Series of the invention which produces crude oil of up to 22° API, with improved quality of the product and, also, commercial gains for the oil produced. It is important to note that in FIG. 11 there is a reduction of the frequency from 60 Hz to 30 Hz of the pump used in this process, proportionally reducing the electric energy costs.

Figure 12:
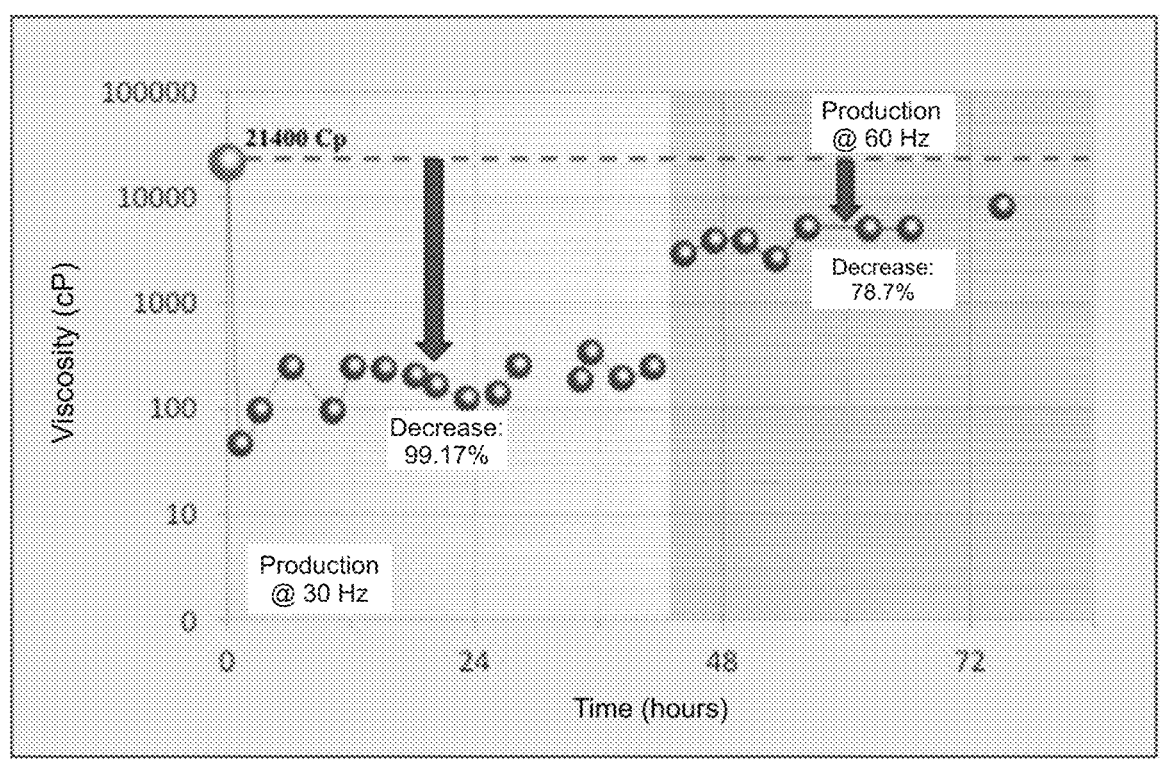
FIG. 12—is a graph, in a preferred embodiment of the invention, whereby the viscosity reduction by 99% is identified in the same practical test described in FIG. 11.

FIG. 12 shows the 99% viscosity reduction in centipoises of the same practical test described in FIG. 11. Thus, FIG. 12 is a further demonstration of the effect of the present invention.

Figure 13:
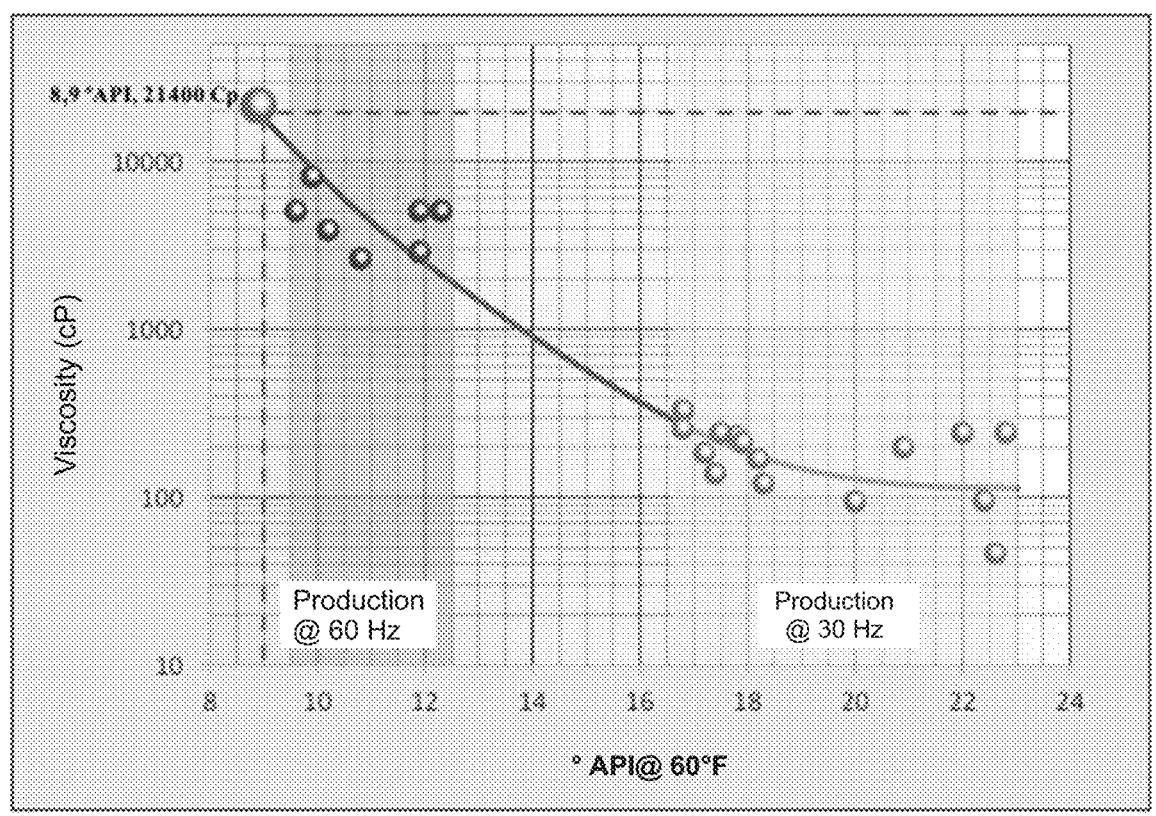
FIG. 13—is a graph, in a preferred embodiment of the invention, of the combination of FIGS. 11 and 12, in the same practical test, indicating the linearity of viscosity reduction with the API grade of a given oil, treated with the invention.

Through FIG. 13 the linearity of viscosity reduction with the API grade of a given oil, treated with the invention, is identified. Accordingly, FIG. 13 is a combination of FIGS. 11 and 12, thus, a further demonstration of the effect of the present invention.

Figure 14:
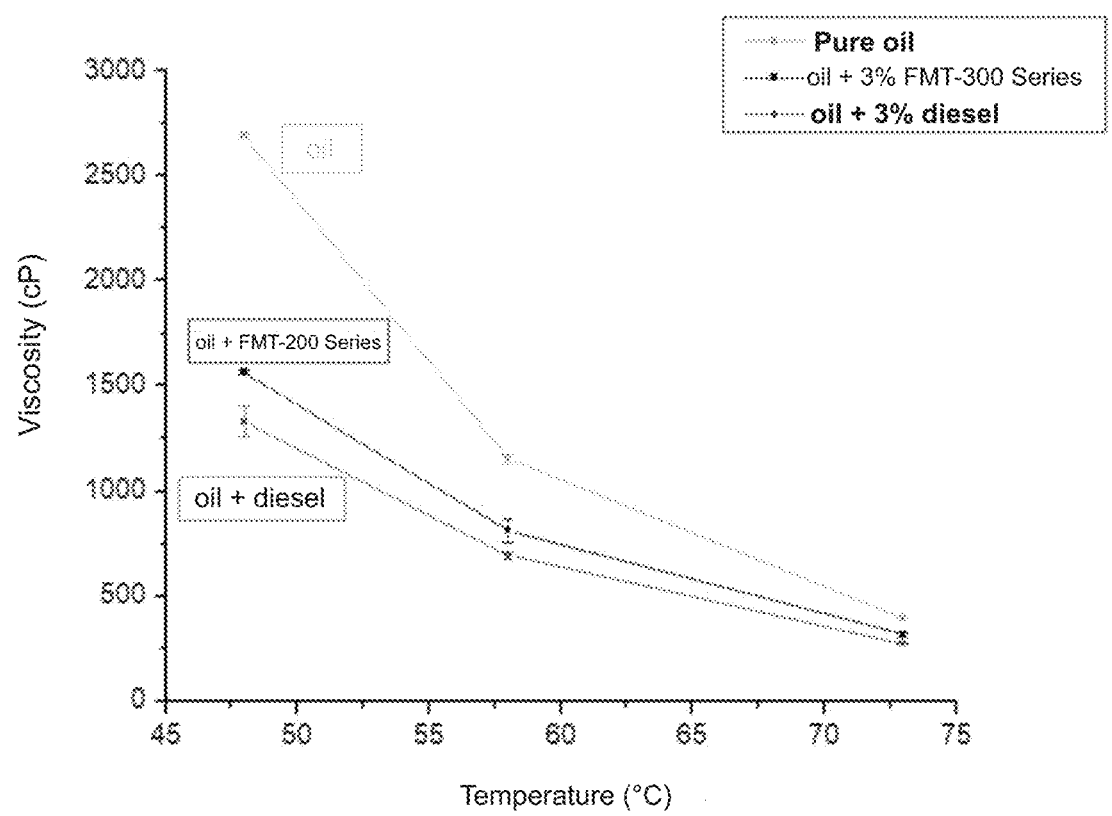
FIG. 14—is a graph, in a preferred embodiment of the invention, whereby a practical test of an oil sample with diesel is identified, a sample of the same oil with 3% by volume of the FMT-200 Series, relative to total volume, and a sample of the same pure oil (13.8° API) as the temperature is raised.
Figure 15:
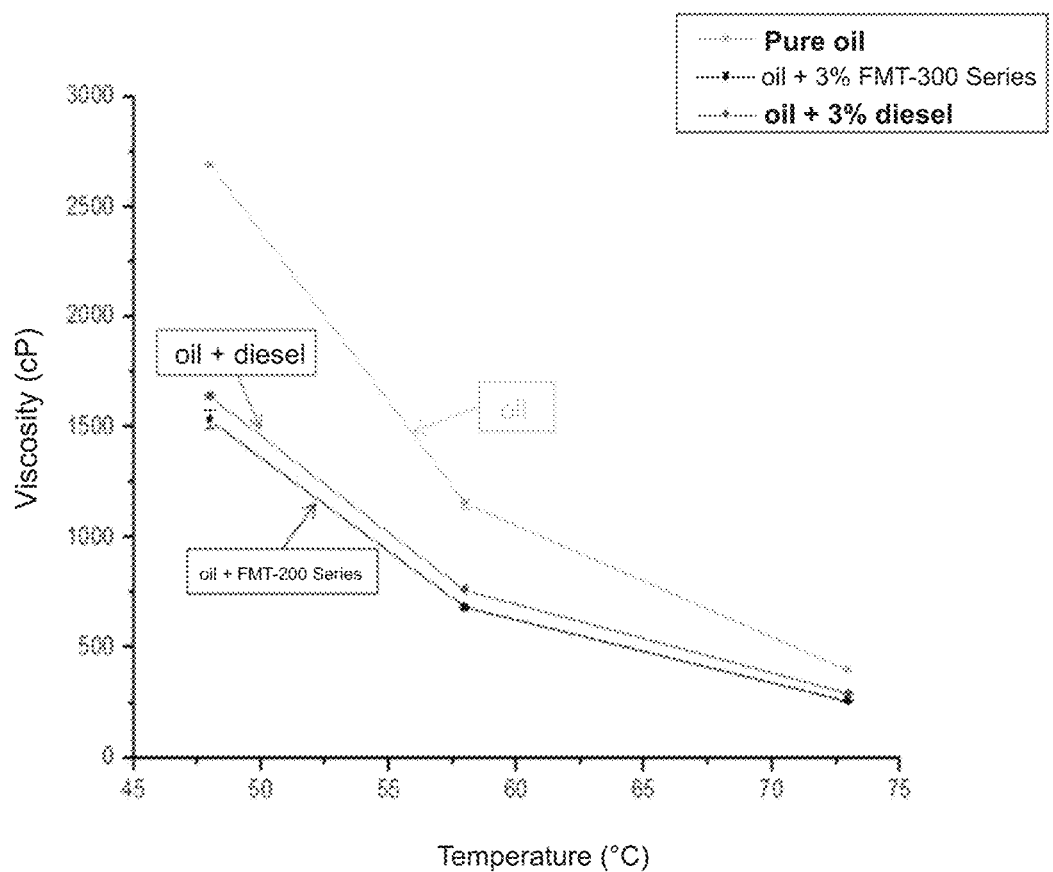
FIG. 15—is a graph, in a preferred embodiment of the invention, whereby the practical test of FIG. 14 is identified after 4 days of application, wherein the light diesel fractions evaporate and the viscosity increases again, which does not occur in the sample to which the invention was applied.

FIGS. 14 and 15 show the viscosity reduction of a sample with the FMT-200 Series applied in volume of 3% in relation to the total volume, and its synergistic effect compared to a sample with diesel after 4 days of application. It is observed that, after 4 days, the effects of diesel are reduced until they are totally lost, by evaporation of the light diesel fractions. Accordingly, FIGS. 14 and 15 are a further demonstration of the synergistic effect of the present invention.

Figure 16:
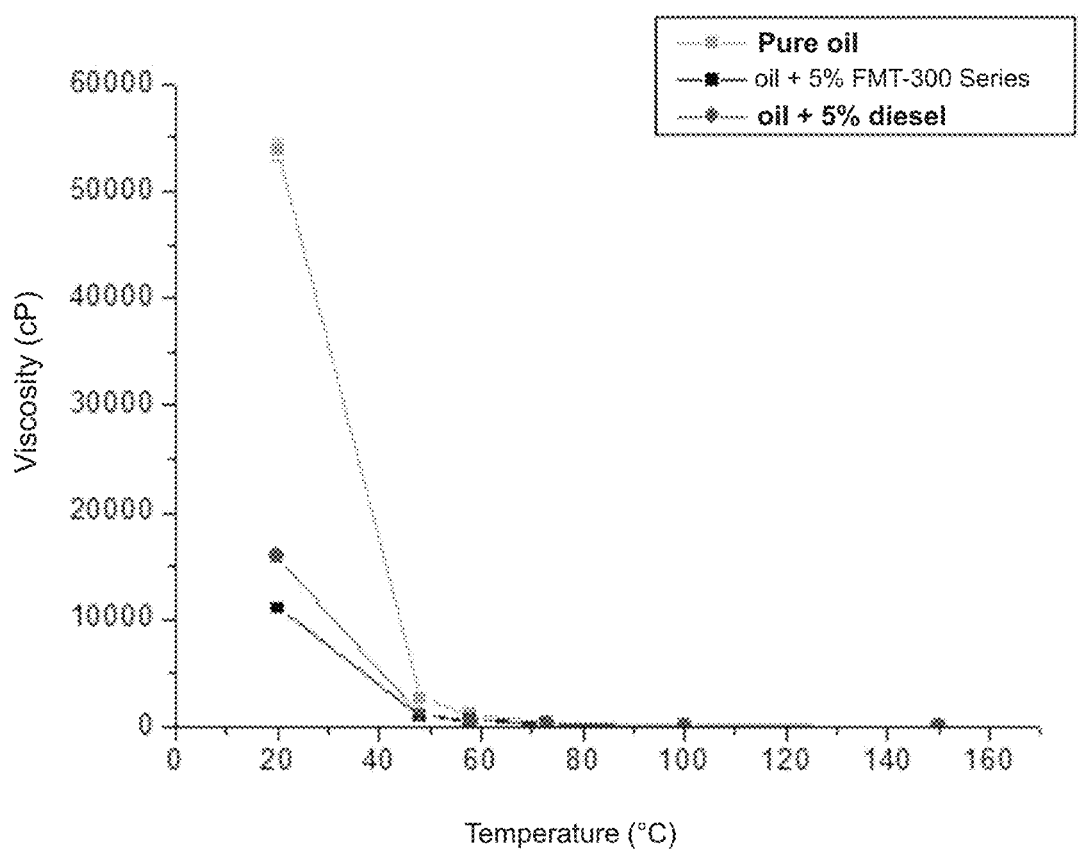
FIG. 16—is a graph, in a preferred embodiment of the invention, whereby a practical test of an oil sample with diesel is identified, a sample of the same oil with 5% by volume of the FMT-200 Series, relative to total volume, and a sample of the same pure oil (13.8° API) as the temperature is raised.
Figure 17:
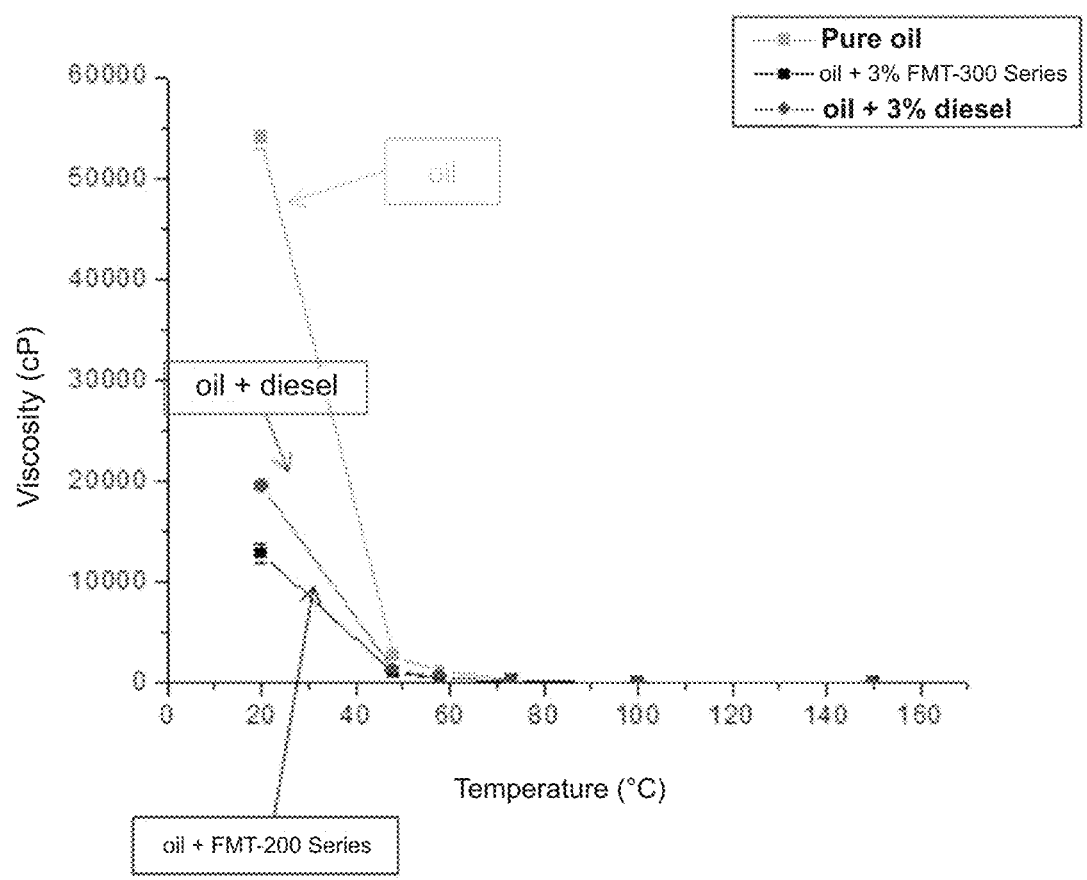
FIG. 17—is a graph, in a preferred embodiment of the invention, whereby the practical test of FIG. 16 is identified after 4 days of application, wherein the light diesel fractions evaporate and the viscosity increases again, which does not occur in the sample to which the invention was applied.

FIGS. 16 and 17 show the viscosity reduction of a sample with the FMT-200 Series applied in volume of 5% in relation to the total volume and its synergistic effect compared to a sample with diesel after 4 days of application. It is observed that, after 4 days, the effects of diesel are reduced until they are totally lost, by evaporation of the light diesel fractions. Thus, FIGS. 16 and 17 are a further demonstration of the synergistic effect of the present invention.

Figure 18:
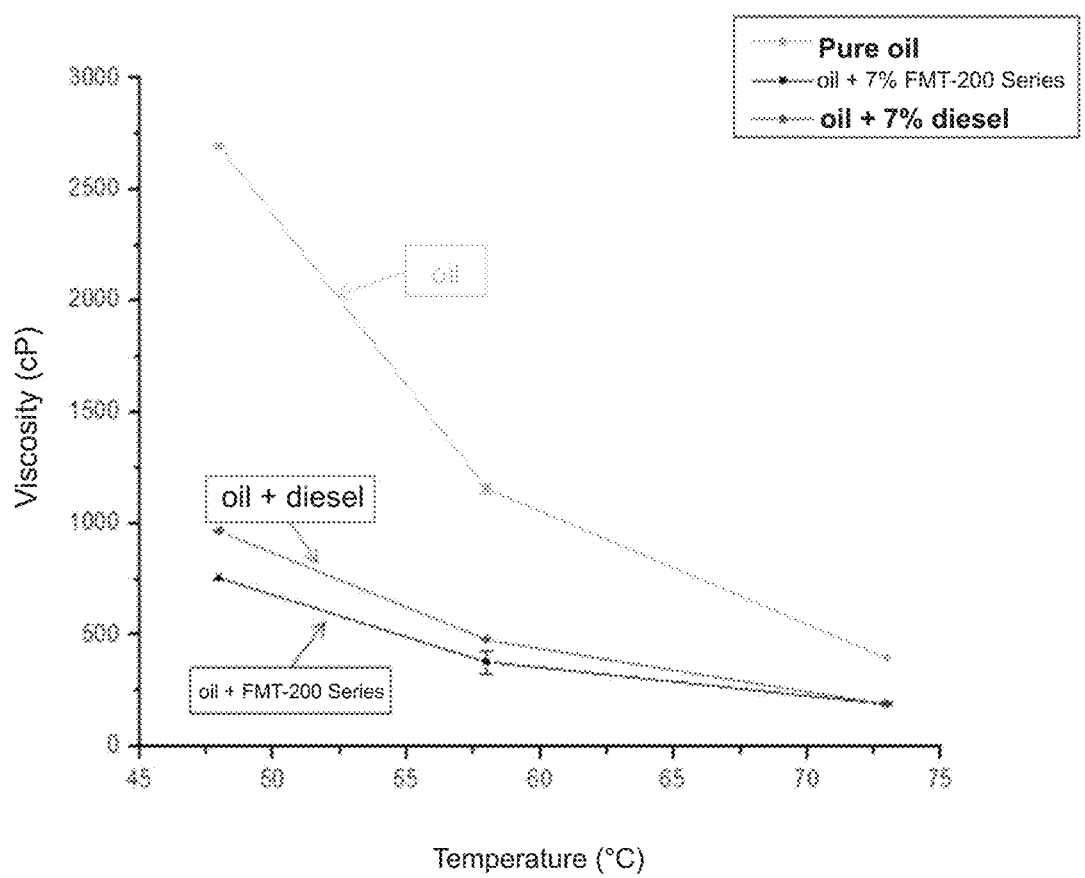
FIG. 18—is a graph, in a preferred embodiment of the invention, whereby a practical test of an oil sample with diesel is identified, a sample of the same oil with 7% by volume of the FMT-200 Series, relative to total volume, and a sample of the same pure oil (13.8° API) as the temperature is raised.
Figure 19:
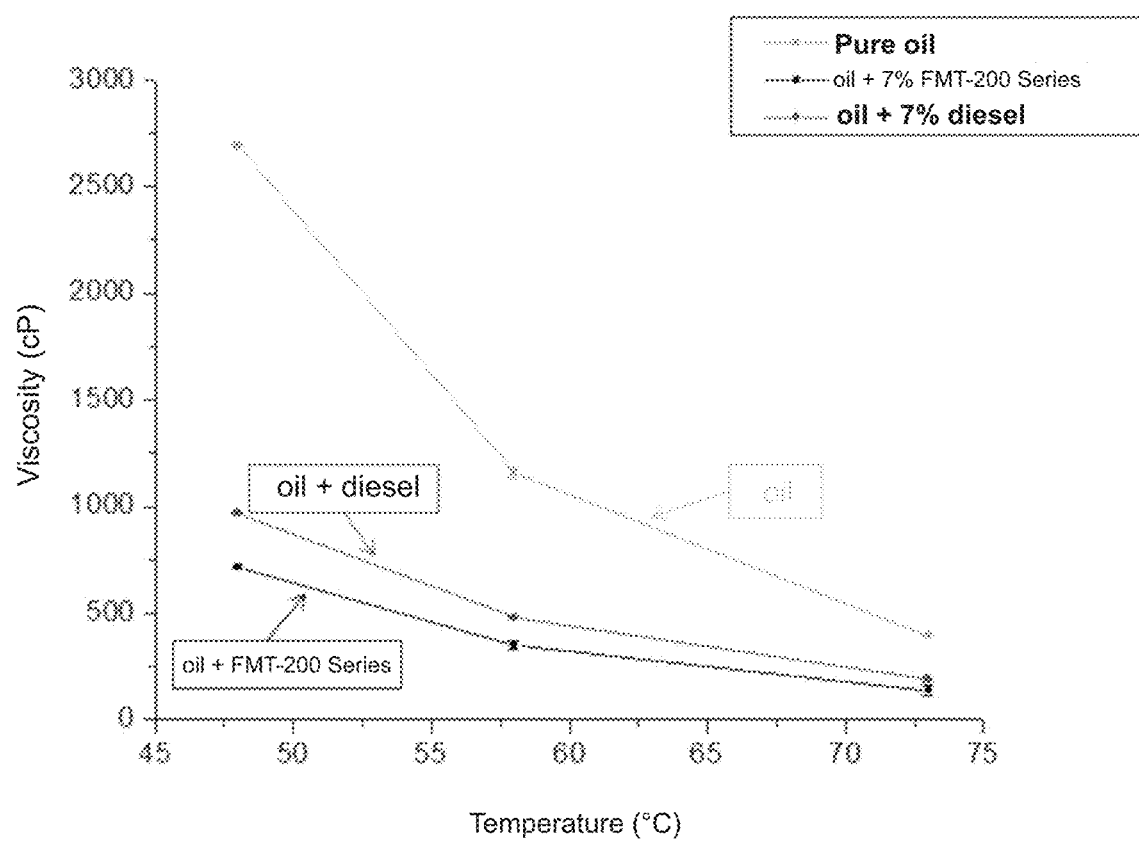
FIG. 19—is a graph, in a preferred embodiment of the invention, whereby the practical test of FIG. 17 is identified after 4 days of application, wherein the light diesel fractions evaporate and the viscosity increases again, which does not occur in the sample to which the invention was applied.

FIGS. 18 and 19 show the viscosity reduction of a sample with the FMT-200 Series applied in volume of 5% in relation to the total volume and its synergistic effect compared to a sample with diesel after 4 days of application. It is observed that, after 4 days, the effects of diesel are reduced until they are totally lost, by evaporation of the light diesel fractions. Thus, greater viscosity reduction efficiency is proven when identical percentages of the product of the invention and diesel are added to the same crude oil. Therefore, FIGS. 18 and 19 are further evidence of the synergistic effect of the present invention.

In order to facilitate the comparison of a sample with diesel and a sample with the FMT-200 Series applied in volumes of 3, 5 and 7% relative to the total volume, the synergistic effect of the present invention revealed by the data of FIGS. 14, 15, 16, 17, 18 and 19 is reiterated in Tables 8 and 9:

TABLE 8

Comparative test performed between oil with Diesel

| Oil with Diesel | °API | °API increase (%) |
|---|---|---|
| 3% | 14.5 | 5.1 |
| 5% | 14.8 | 7.2 |
| 7% | 15.2 | 10.1 |

TABLE 9

Comparative test performed between oil with the FMT-200 Series

| Oil with the FMT-200 Series | °API | °API increase (%) |
|---|---|---|
| 3% | 14.6 | 5.8 |
| 5% | 15.2 | 10.1 |
| 7% | 15.7 | 13.8 |

Figure 20:
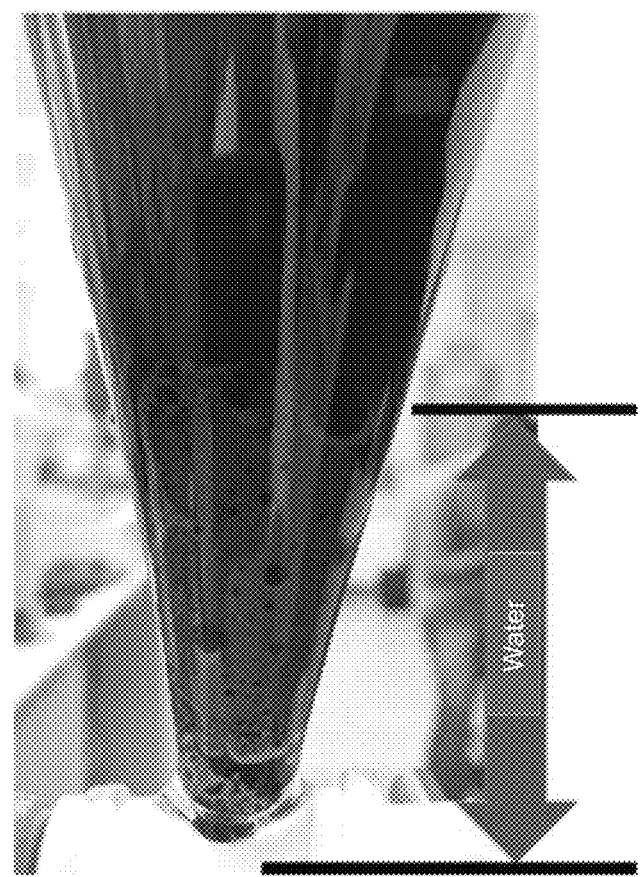
FIG. 20—is a picture, in a preferred embodiment of the invention, whereby an oil sample is identified with the FMT-200 Series disclosed in the present invention 24 hours after addition of the composition of the present invention, showing an increase of water separation (demulsibility) through the action of the product of the present invention.

FIG. 20 identifies the water separation in the sample, with a significant water-oil separation being observed due to the application of the present invention. Thus, FIG. 20 is a further demonstration of the effect of the present invention.

Figure 21:
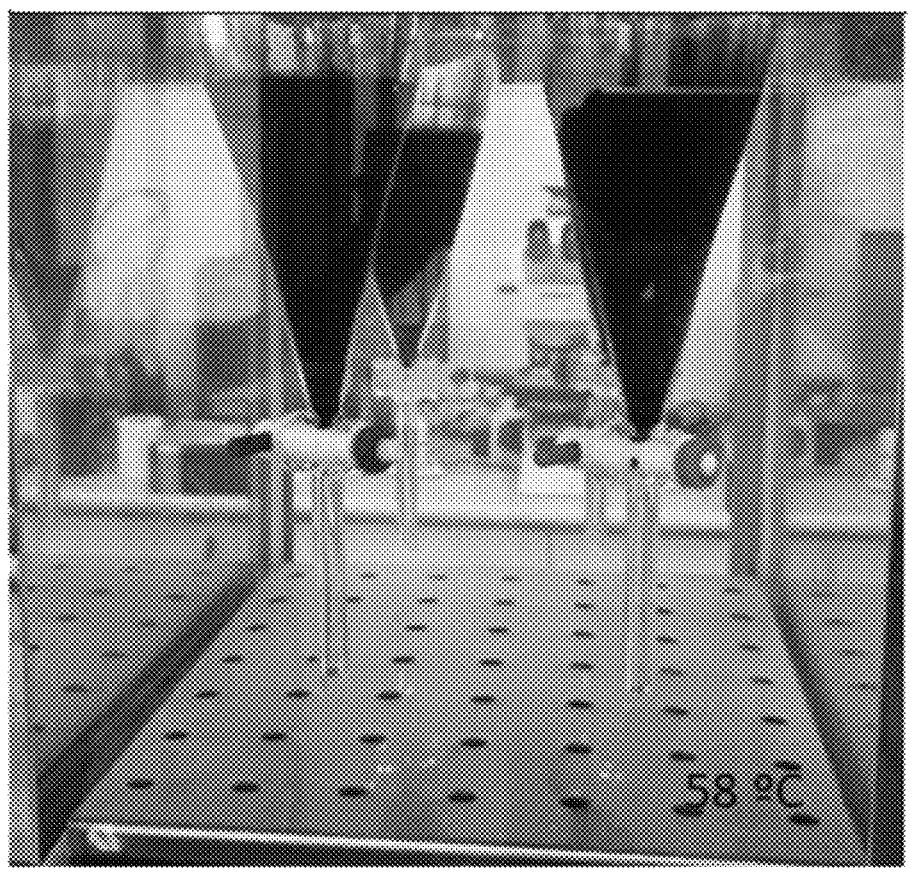
FIG. 21—is a picture, in a preferred embodiment of the invention, whereby samples of oil of the composition disclosed in the present invention and oil with diesel are identified, 144 hours after addition thereof at 58° C.

FIG. 21 identifies the water separation in the sample, with a significant water-oil separation being observed due to the application of the present invention. Accordingly, FIG. 21 is a further demonstration of the effect of the present invention.

Figure 22:
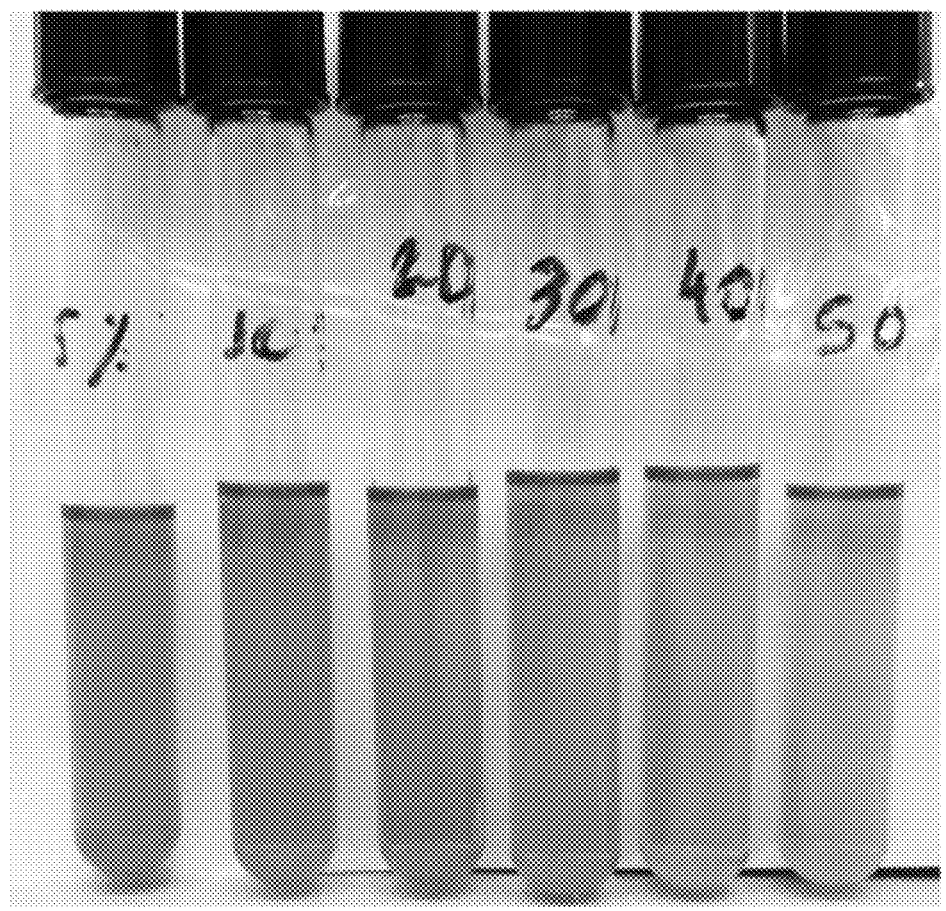
FIG. 22—is a picture, in a preferred embodiment of the invention, whereby diesel samples are identified with concentrations of 5%, 10%, 20%, 30%, 40% and 50% v/v, from left to the right, respectively, with the composition disclosed by the present invention, indicating good compatibility with diesel, applied in oil extraction operations.

FIG. 22 shows the compatibility of the present invention with most components of the major oils, which mainly comprise non-polar components, i.e., FIG. 22 is a further demonstration of the synergistic effect of the present invention, due to the good compatibility of the compound disclosed by the present invention with diesel.

Figure 23:
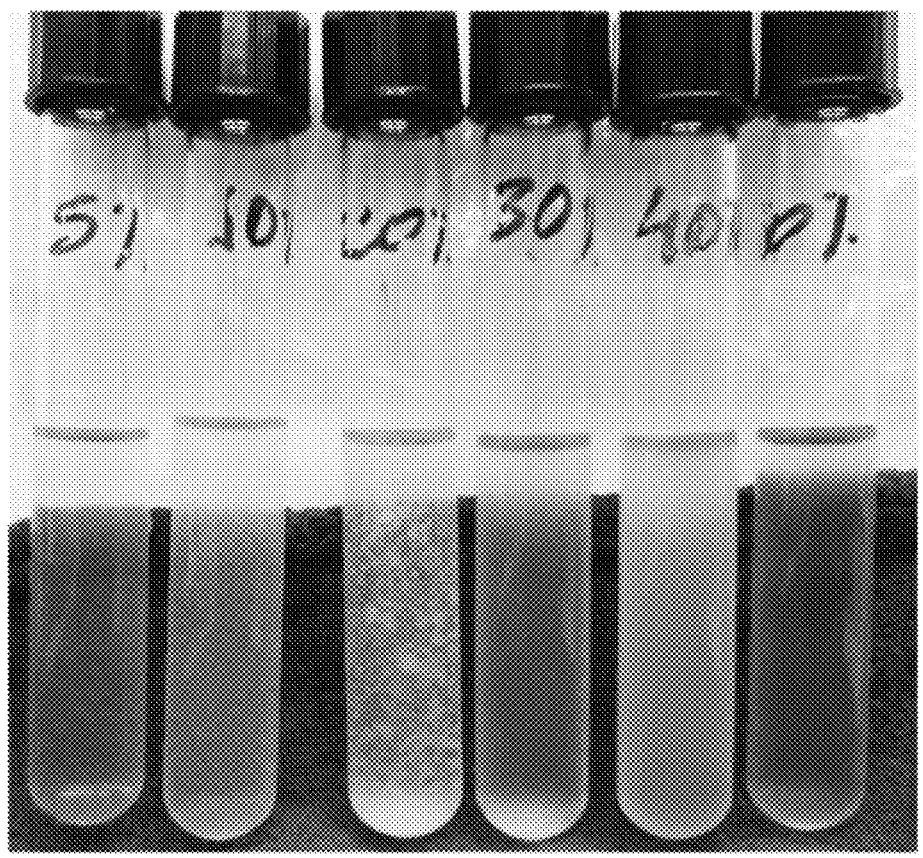
FIG. 23—is a picture, in a preferred embodiment of the invention, whereby ethanol samples are identified at concentrations of 5%, 10%, 20%, 30%, 40% and 50% v/v, from left to the right, respectively, with the composition disclosed by the present invention indicating good compatibility with anhydrous ethanol, applied in oil extraction operations.

FIG. 23 shows the compatibility of the present invention with most components of the major oils, which mainly comprise non-polar components, i.e., FIG. 23 is a further demonstration of the synergistic effect of the present invention due to the good compatibility of the compound disclosed by the present invention with anhydrous ethanol.

Figure 24:
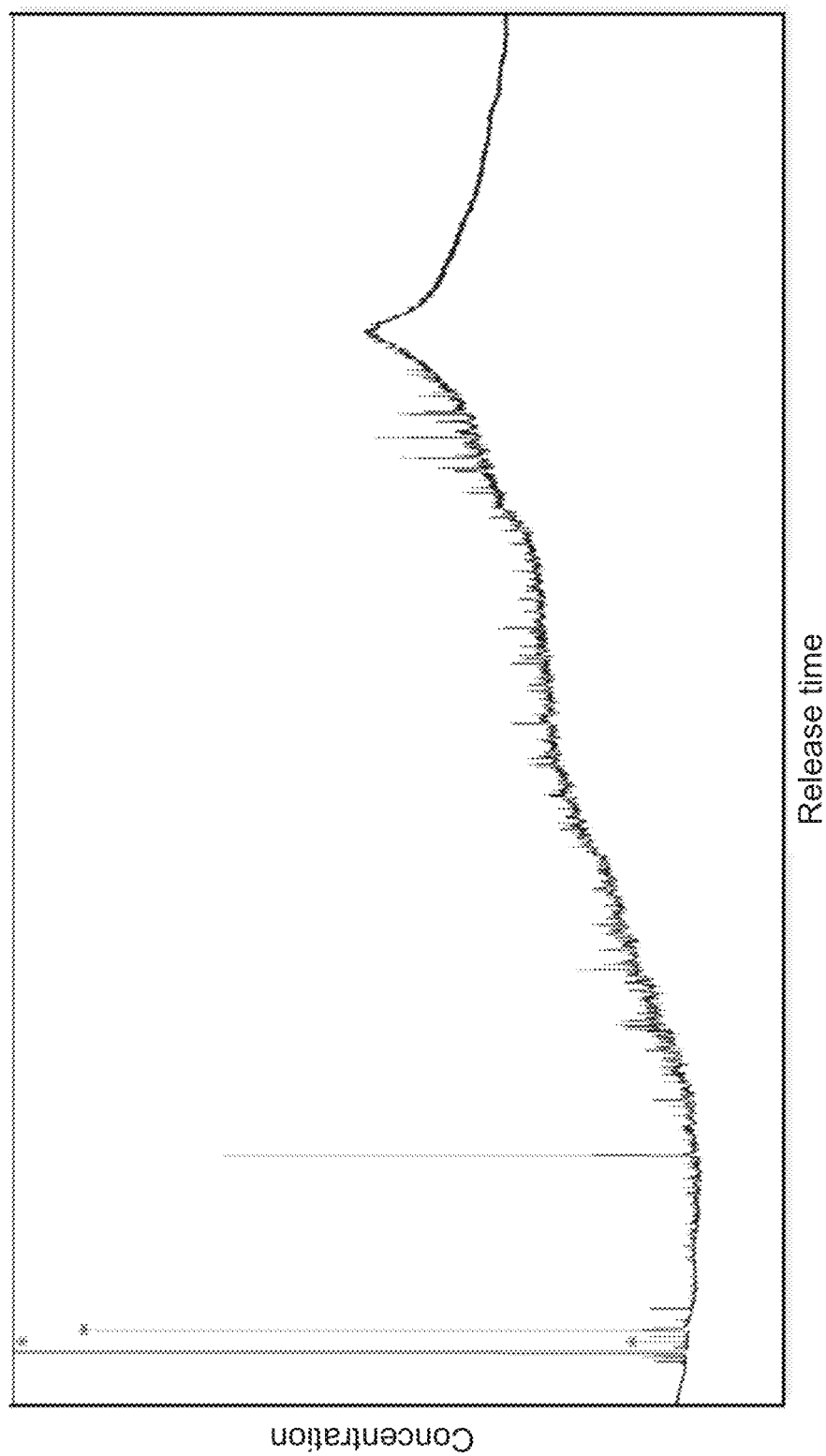
FIG. 24—is a picture, in a preferred embodiment of the invention, whereby a chromatogram obtained by gas chromatography of a heavy crude oil sample—about 12° API—is identified wherein the X-axis represents the release time of each constituent component of the sample and the Y axis represents the concentration of a given element.

FIG. 24 identifies that a relevant concentration of high molecular weight compound (end of the X-axis) is expelled from the column over a long time, indicating the presence of resins and asphaltenes, and that there is little presence of low molecular weight compounds (initial part of the X axis).

Figure 25:
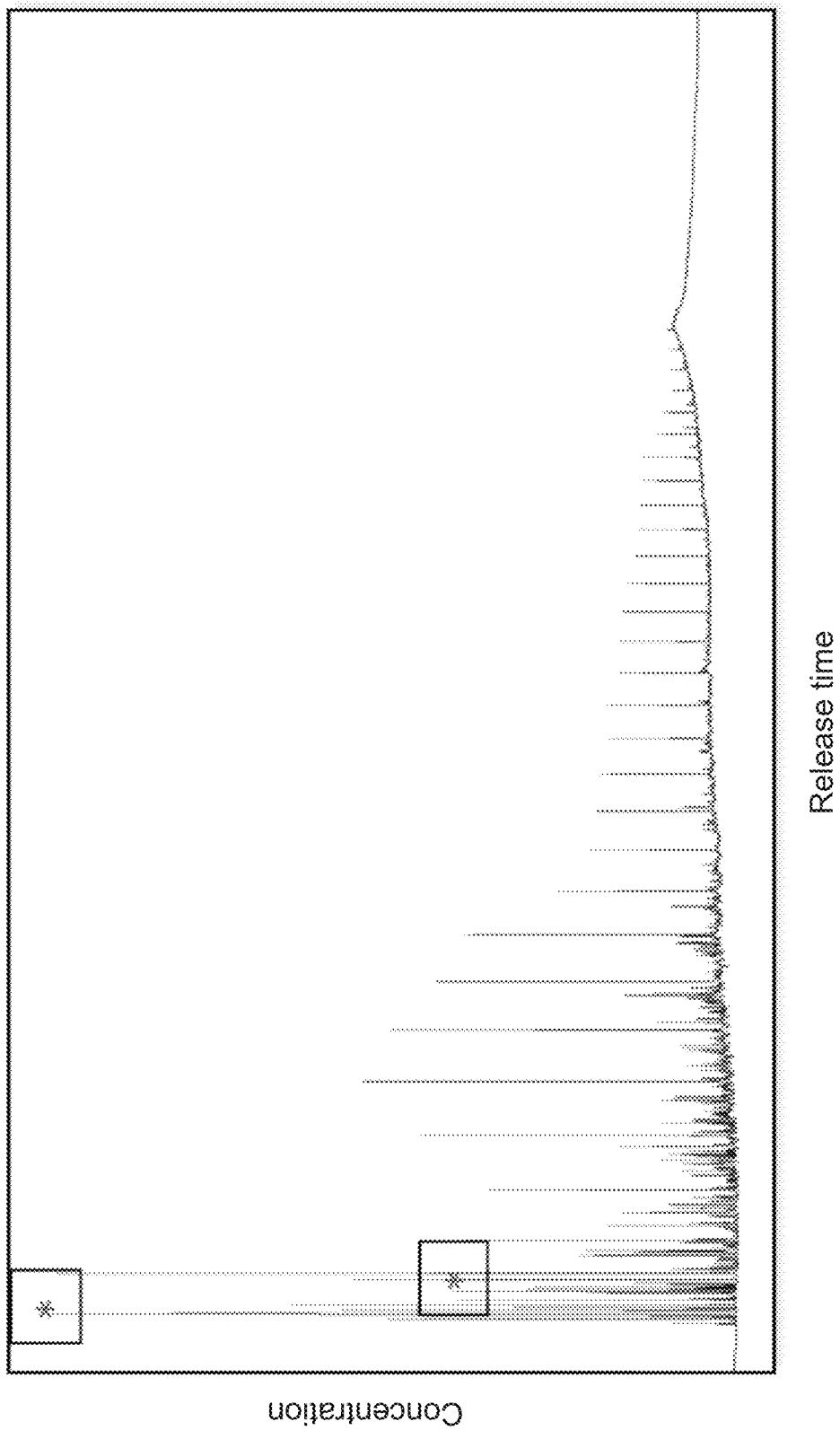
FIG. 25—is a picture, in a preferred embodiment of the invention, whereby the chromatogram obtained by gas chromatography of a heavy crude oil sample—about 12° API—is treated with 5% of the composition of the present invention, wherein the axis X represents the release time of each constituent component of the sample and the Y-axis represents the concentration of a given element.
Figure 26:
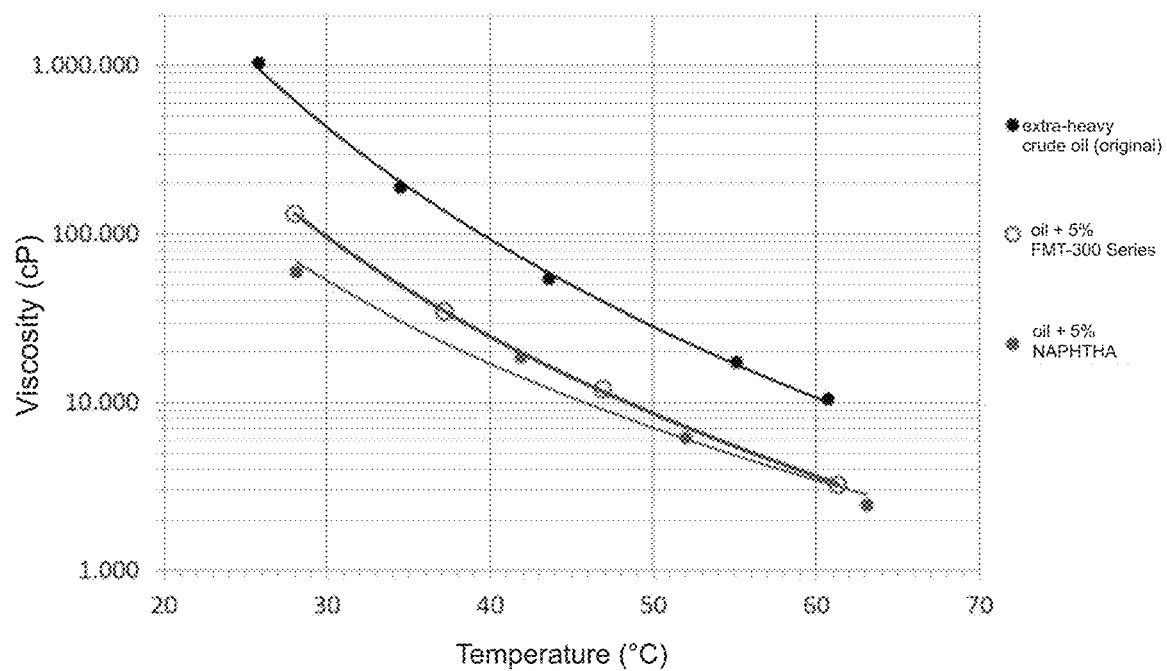
FIG. 26—is a graph, in a preferred embodiment of the invention, whereby a practical test is identified of an extra-heavy oil sample (8.6° API) with 5% by volume of naphtha, relative to the total volume, a sample of the same oil with 5% by volume of the FMT-300 Series, in relation to the total volume, and a sample of the same original oil (8.6° API) as the temperature is raised. It has been found that, shortly after the mixtures, naphtha is shown to be more efficient in viscosity reduction. At higher temperatures—operating temperatures—the difference in viscosity between the mixture made with naphtha and with FMT is negligible.
Figure 27:
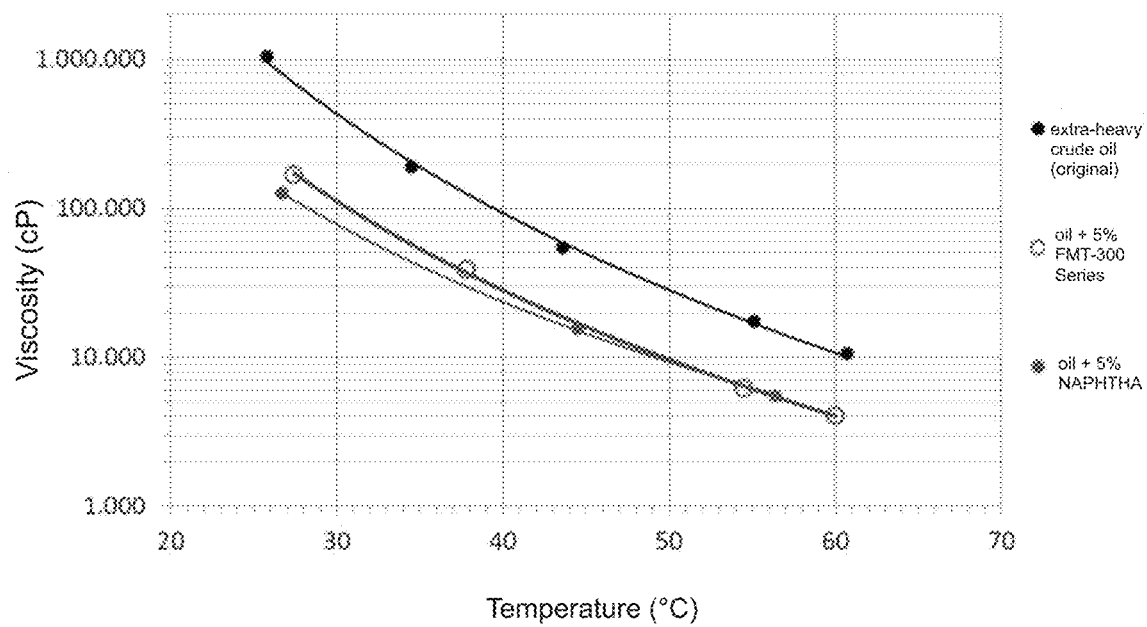
FIG. 27—is a graph, in a preferred embodiment of the invention, whereby the practical test of FIG. 26 is identified after 1 day of application, wherein light naphtha fractions evaporate and viscosity increases, which does not occur in the sample to which the invention was applied, so that even at lower temperatures the difference in viscosity between the mixture made with naphtha and with FMT is already irrelevant.
Figure 28:
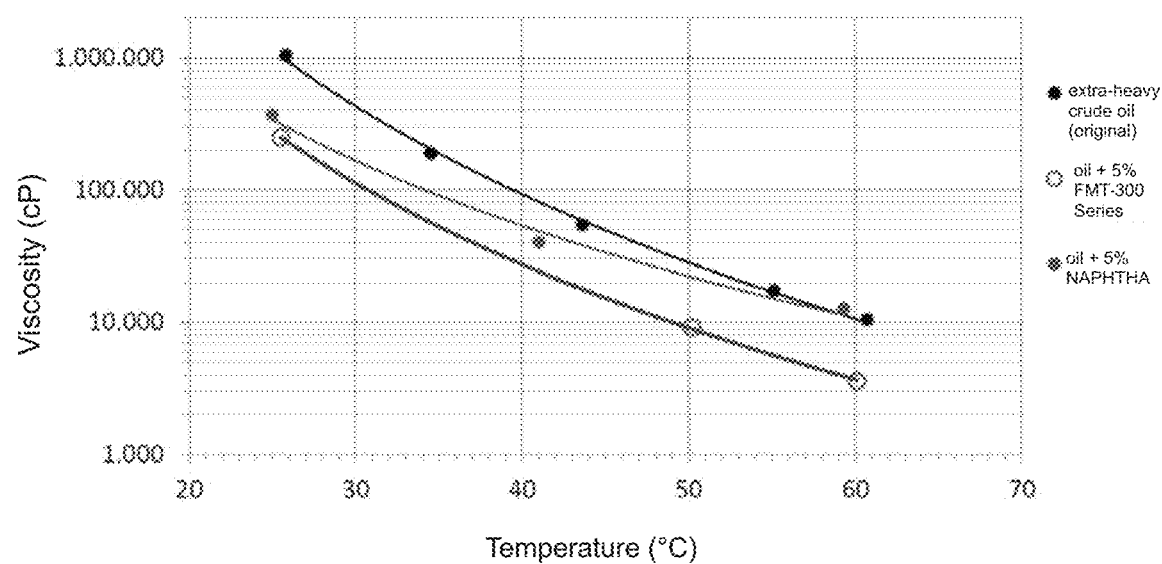
FIG. 28—is a graph, in a preferred embodiment of the invention, whereby the practical test of FIG. 26 is identified after 5 days of application, further demonstrating the evaporation of light naphtha fractions and that the viscosity of the sample to which naphtha has been applied increases, which does not occur in the sample to which the invention was applied and, at process temperatures, the naphtha mixture has the same viscosity as that of crude oil with no addition.
Figure 29:
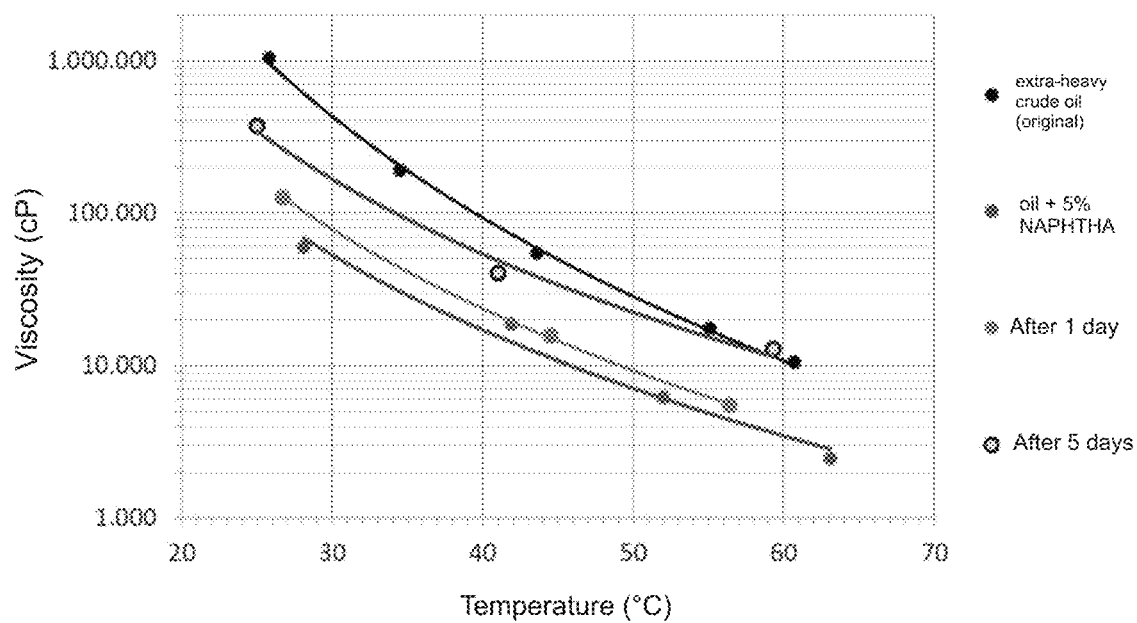
FIG. 29—is a graph, in a preferred embodiment of the invention, whereby a comparison of FIGS. 26, 27 and 28 of the present application is identified, reiterating that evaporation of the light naphtha fractions occurs, increasing the viscosity in the sample to which the naphtha was applied, while the viscosity of the sample to which the invention was applied is reduced perennially.

FIG. 25 identifies that the relevant concentration of the high molecular weight compound (end of the X-axis), seen in FIG. 24, is replaced with several low molecular weight compounds (initial part of the X-axis), proving the lubricating effect at the molecular level and releasing the lighter compounds that were trapped by the molecules of resins and asphaltenes (high molecular weight). Thus, FIGS. 24 and 25 are further evidence of the effect of the "molecular level lubrication" process of the present invention.

The synergistic effect of the present application in comparison with naphtha is identified in detail in FIGS. 26, 27, 28 and 29, it being known that the viscosity of the sample to which naphtha has been applied, over time, increases, whereas the viscosity of the sample to which the present invention has been applied is reduced perennially. Accordingly, FIGS. 26, 27, 28 and 29 are a further demonstration of the effect of the present invention In order to facilitate comparison of a sample with 5% of naphtha and a sample with 5% of the FMT-300 Series, on the day of application, after 1 day and after 5 days, respectively, the synergistic effect of the present invention revealed by data of FIGS. 26, 27, 28 and 29 is reiterated in Tables 10, 11 and 12:

TABLE 10

Results of the day of the comparative test

| Sample | Lab temperature (° C.) | Sample temperature (° C.) | TORQUE (%) | RPM | Viscosity (Cp) |
|---|---|---|---|---|---|
| Oil (ORIGINAL) | 26.7 | 25.8 | 81.1 | 3 | 1042186 |
| | 26.3 | 34.5 | 75.7 | 4 | 189900 |
| | 26.3 | 43.6 | 88.6 | 5. | 54402 |

TABLE 10-continued

Results of the day of the comparative test

| Sample | Lab temperature (° C.) | Sample temperature (° C.) | TORQUE (%) | RPM | Viscosity (Cp) |
|---|---|---|---|---|---|
|  | 26.5 | 55.1 | 52.3 | 6 | 17436 |
|  | 26.5 | 60.7 | 47.5 | 6 | 10526 |
| Oil + 5% | 26.0 | 28.0 | 78.8 | 6 | 131690 |
| FMT-300 | 26.3 | 37.2 | 82.0 | 20 | 34750 |
| Series | 26.1 | 46.9 | 90.0 | 30 | 12018 |
|  | 26.4 | 61.3 | 81.6 | 50 | 3250 |
| Oil + 5% | 26.4 | 28.1 | 71.5 | 12 | 59550 |
| NAPHTHA | 26.6 | 41.9 | 93.1 | 50 | 18615 |
|  | 26.3 | 52.0 | 77.8 | 50 | 6190 |
|  | 26.4 | 63.1 | 73.7 | 60 | 2457 |

TABLE 11

Comparative test results after 1 day

| Sample | Lab temperature (° C.) | Sample temperature (° C.) | TORQUE (%) | RPM | Viscosity (Cp) |
|---|---|---|---|---|---|
| Oil + 5% | 27.9 | 27.4 | 83.9 | 5 | 168352 |
| FMT-300 | 28.2 | 37.8 | 77.8 | 20 | 38850 |
| Series | 27.8 | 54.5 | 78.2 | 50 | 6210 |
|  | 26.7 | 60.0 | 62.4 | 30 | 4060 |
| Oil + 5% | 26.1 | 26.7 | 75.6 | 6 | 125830 |
| NAPHTHA | 25.5 | 44.5 | 93.6 | 60 | 15590 |
|  | 27.7 | 56.4 | 60.4 | 60 | 5500 |

TABLE 12

Results of the comparative test after 5 days

| Sample | Lab temperature (° C.) | Sample temperature (° C.) | TORQUE (%) | RPM | Viscosity (Cp) |
|---|---|---|---|---|---|
| Oil + 5% | 25.0 | 25.5 | 58 | 6 | 250125 |
| FMT-300 | 25.4 | 50.2 | 69 | 30 | 9203 |
| Series | 26.1 | 60.1 | 48 | 100 | 3600 |
| Oil + 5% | 26.1 | 25.0 | 74.1 | 12 | 372491 |
| NAPHTHA | 26.3 | 41.0 | 76.3 | 30 | 40218 |
|  | 25.4 | 59.3 | 63.5 | 20 | 12720 |

Figure 30:
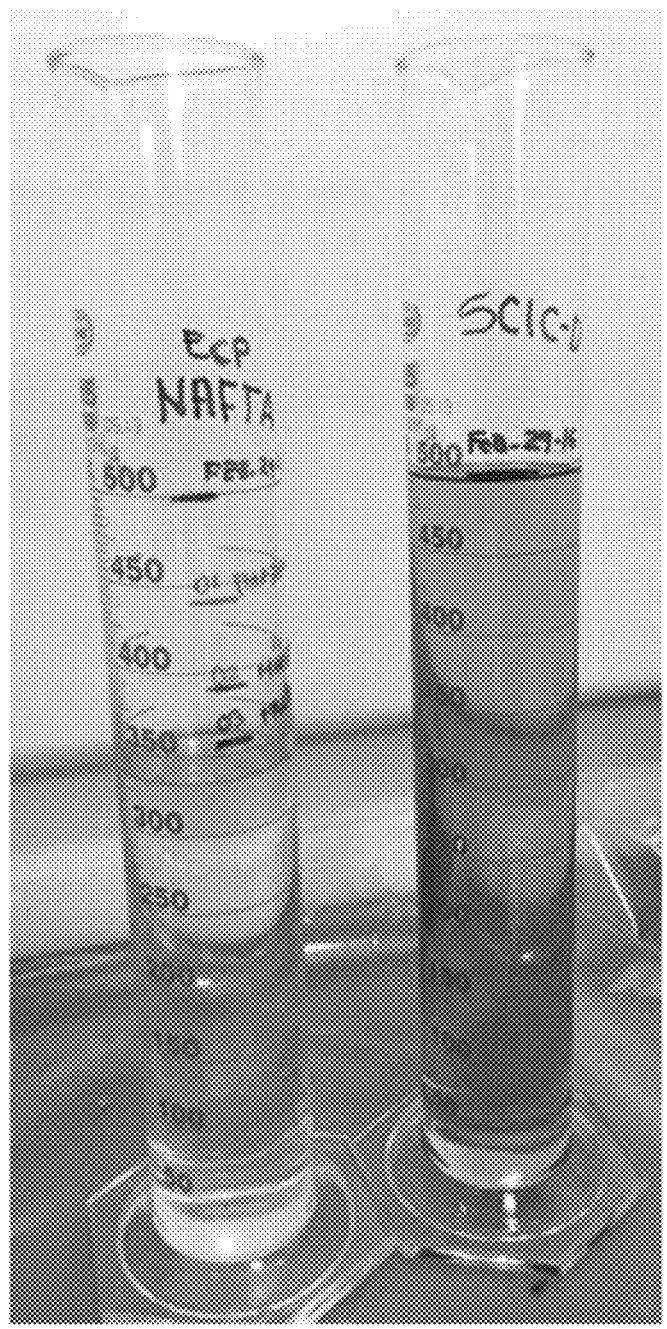
FIG. 30—is a picture, in a preferred embodiment of the invention, whereby two samples, a naphtha sample and another sample of the composition of the present invention, respectively, are identified from left to right. After 3 days at ambient temperature (22° C.), it is observed that the volume of naphtha decays about 28%, whereas the volume of the present invention does not show any loss, proving the inefficiency and the process losses when the mixture is carried out with naphtha and not with the product object of the present invention.

FIG. 30 shows the low volatility of the present invention, as compared to that of the naphtha volatility. Thus, FIG. 30 is a further demonstration of the effect of the present invention.

Figure 31:
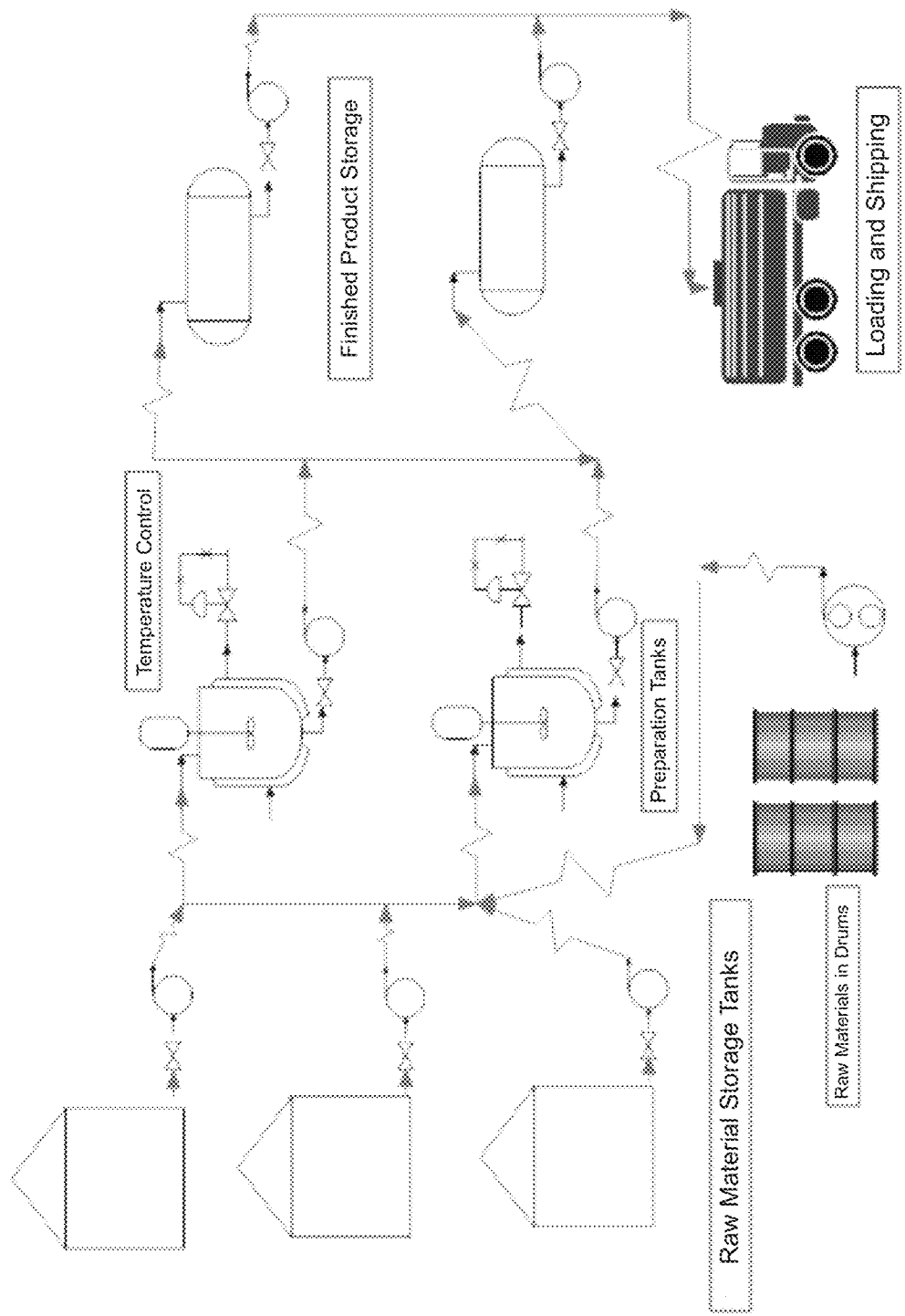
FIG. 31—is a block diagram of the process used in the production of the present invention in which the following elements are identified: the raw material storage tanks, the preparation tanks, the temperature control system, the raw material in drums, the storage of the finished product, and loading and shipping.

FIG. 31 shows the manufacturing process of the present invention in detail.

The examples described above represent preferred embodiments; however, it should be understood that the scope of the present invention encompasses other possible variations, and is limited only by the content of the appended claims, which include all possible equivalents.

The invention claimed is:

1. A viscosity-modifying and demulsifier composition, characterized by comprising:
   (a) from 50% to 60% by volume of petroleum distillate;
   (b) from 35% to 49% by volume of a liquid lipid mixture; and
   (c) from 1% to 5% by volume of phospholipid, relative to the total volume of said composition; and further characterized in that said liquid lipid mixture is represented by the formula:

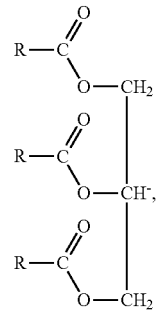

wherein:
   R is a hydrocarbon with single and/or double bonds, wherein R has 12 to 20 carbon atoms.

2. The composition according to claim 1, characterized in that said liquid lipid mixture comprises:
   80% by volume of unsaturated lipids, and
   20% by volume of saturated lipids, relative to the total volume of said lipid mixture.

3. The composition according to claim 1, characterized in that said petroleum distillate is from $C_8$ to $C_{16}$, and
   wherein said petroleum distillate has low volatility.

4. The composition according claim 1, characterized in that it is a homogeneous mixture, and
   wherein said composition further comprises dyes and/or aromatizing agents.

5. The composition according to claim 1, characterized in that said phospholipids are represented by the formula:

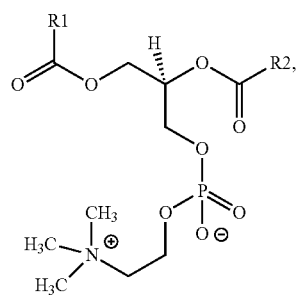

wherein:
   R1 is a hydrocarbon having single and/or double bonds, wherein R1 has from 14 to 20 carbon atoms; and
   R2 is a hydrocarbon with single and/or double bonds, wherein R2 has from 11 to 17 carbon atoms.

6. The composition according to claim 1, characterized in that it comprises substantially organic substances.

7. The composition according to claim 1, characterized in that it is lubricant, non-corrosive, having low volatility, not containing water and not containing a solid phase.

8. The composition according to claim 1, characterized in that it does not contain aromatic solvents, such as benzene, toluene and/or xylene.

9. The composition according to claim 1, characterized in that it is for use in heavy and/or extra-heavy crude oil,
   wherein the heavy and/or extra-heavy crude oil is selected from the group consisting of paraffinic, aromatic and asphaltenic.

10. The composition according to claim 9, characterized in that the volume of said composition is in the range of from 3 to 5% of the total volume, according to the classification of the heavy or extra-heavy crude oil, wherein said composition is applied.

11. The composition according to claim 1, characterized by comprising:
   (a) from 50 to 54% by volume of petroleum distillate;
   (b) from 43 to 49% by volume of liquid lipid mixture; and
   (c) from 1 to 3% by volume of phospholipid, relative to the total volume of said composition,
   wherein said composition is for use in heavy crude oil.

12. The composition according to claim 11, characterized by comprising:
   (a) 52% by volume of petroleum distillate;
   (b) 46% by volume of liquid lipid mixture; and
   (c) 2% by volume of phospholipid, relative to the total volume of said composition,
   wherein said composition is for use in paraffinic heavy crude oil.

13. The composition according to claim 11, characterized by comprising:
   (a) 50% by volume of petroleum distillate;
   (b) 49% by volume of liquid lipid mixture; and
   (c) 1% by volume of phospholipid, relative to the total volume of said composition,
   wherein said composition is for use in heavy aromatic crude oil.

14. The composition according to claim 11, characterized by comprising:
   (a) 54% by volume of petroleum distillate;
   (b) 43% by volume of liquid lipid mixture; and
   (c) 3% by volume of phospholipid, relative to the total volume of said composition,
   wherein said composition is for use in crude asphaltenic crude oil.

15. The composition according to claim 1, characterized by comprising:
   (a) from 56 to 60% by volume of petroleum distillate;
   (b) from 35 to 40% by volume of liquid lipid mixture; and
   (c) from 4 to 5% by volume of phospholipid, relative to the total volume of said composition,
   wherein said composition is for use in extra-heavy crude oil.

16. The composition according to claim 15, characterized by comprising:
   (a) 58% by volume of petroleum distillate;
   (b) 37% by volume of liquid lipid mixture; and
   (c) 5% by volume of phospholipid, relative to the total volume of said composition,
   wherein said composition is for use in extra-heavy paraffinic crude oil.

17. The composition according to claim 15, characterized by comprising:
   (a) 56% by volume of petroleum distillate;
   (b) 40% by volume of liquid lipid mixture; and
   (c) 4% by volume of phospholipid, relative to the total volume of said composition,
   wherein said composition is for use in extra-heavy aromatic crude oil.

18. The composition according to claim 15, characterized by comprising:
   (a) 60% by volume of petroleum distillate;
   (b) 35% by volume of liquid lipid mixture; and
   (c) 5% by volume of phospholipid, relative to the total volume of said composition,
   wherein said composition is for use in extra-heavy asphaltenic crude oil.

19. A process for manufacturing a composition as defined in claim 1, characterized by comprising the steps of:
   (a) mixing the components of said composition, and
   (b) maintaining the temperature of said composition in the range of 0° C. to 50° C.

20. The process according to claim 19, characterized in that said homogenizing step lasts 6 hours.

* * * * *